US012654373B2

(12) United States Patent
French et al.

(10) Patent No.: US 12,654,373 B2
(45) Date of Patent: Jun. 16, 2026

(54) METHOD FOR FABRICATING MICROSTRUCTURED INSERTS FOR INJECTION MOLDING

(71) Applicant: ESSILOR INTERNATIONAL, Charenton-le-Pont (FR)

(72) Inventors: Elliot French, Charlton, MA (US); Burcin Ikizer, Lowell, MA (US); Zbigniew Tokarski, Woodstock, CT (US); Eric Gacoin, Paris (FR); Sebastien Henrion, Créteil (FR)

(73) Assignee: Essilor International, Charenton-le-pont (FR)

( * ) Notice: Subject to any disclaimer, the term of this patent is extended or adjusted under 35 U.S.C. 154(b) by 102 days.

(21) Appl. No.: 18/574,673

(22) PCT Filed: Jul. 12, 2022

(86) PCT No.: PCT/EP2022/069444
§ 371 (c)(1),
(2) Date: Dec. 27, 2023

(87) PCT Pub. No.: WO2023/285452
PCT Pub. Date: Jan. 19, 2023

(65) Prior Publication Data
US 2024/0316846 A1 Sep. 26, 2024

(30) Foreign Application Priority Data
Jul. 13, 2021 (EP) .................................... 21305982

(51) Int. Cl.
*B29C 45/26* (2006.01)
*B29C 33/38* (2006.01)
(Continued)

(52) U.S. Cl.
CPC ...... *B29C 45/2632* (2013.01); *B29C 33/3878* (2013.01); *B29C 2033/426* (2013.01); *B29K 2663/00* (2013.01); *B29L 2011/0016* (2013.01)

(58) Field of Classification Search
None
See application file for complete search history.

(56) References Cited

U.S. PATENT DOCUMENTS

2003/0075814 A1 4/2003 Keller et al.
2009/0286936 A1* 11/2009 Ogata ................... G03F 7/0017
526/313
(Continued)

FOREIGN PATENT DOCUMENTS

EP 0940244 A2 9/1999
EP 2 594 392 A2 * 5/2013
(Continued)

OTHER PUBLICATIONS

Patrick Abgrall et al.: "A novel fabrication method of flexible and monolithic 3D microfluidic structures using lamination of SU-8 films" , J. Micromech. Microeng. 16 (2006) p. 113-121 (Year: 2006).*
(Continued)

*Primary Examiner* — Mohammad M Ameen
(74) *Attorney, Agent, or Firm* — NIXON & VANDERHYE

(57) ABSTRACT

A method for forming a mold insert includes forming a stamp, a surface of the stamp including a plurality of inverted microstructures formed thereon; and pressing the stamp into a medium disposed on a surface of a first mold insert to form a microstructured film, the microstructured film including a plurality of microstructures formed on a surface of the microstructured film based on the plurality of inverted microstructures, the plurality of microstructures
(Continued)

being complementary to the plurality of inverted microstructures.

15 Claims, 38 Drawing Sheets

(51) Int. Cl.
| | | |
|---|---|---|
| *B29C 33/42* | (2006.01) | |
| *B29K 663/00* | (2006.01) | |
| *B29L 11/00* | (2006.01) | |

(56) References Cited

U.S. PATENT DOCUMENTS

| | | | | | |
|---|---|---|---|---|---|
| 2011/0215342 | A1* | 9/2011 | Oliver | ...................... | H01L 24/97 |
| | | | | | 257/E33.059 |
| 2015/0028325 | A1* | 1/2015 | Seki | ...................... | B29C 45/263 |
| | | | | | 264/293 |
| 2021/0109379 | A1 | 4/2021 | Guillot et al. | | |

FOREIGN PATENT DOCUMENTS

| | | | | |
|---|---|---|---|---|
| ES | 2583761 | T3 | | 9/2016 |
| JP | 2000153543 | A | | 6/2000 |
| JP | 2012 187 762 | A | * | 10/2012 |
| JP | 2012 230 272 | A | * | 11/2012 |
| WO | 8911966 | A1 | | 12/1989 |
| WO | 9513910 | A1 | | 5/1995 |
| WO | WO-95/13910 | | * | 5/1995 |

OTHER PUBLICATIONS

International Search Report for PCT/EP2022/069444 mailed Oct. 27, 2022, 4 pages.
Written Opinion of the ISA for PCT/EP2022/069444 mailed Oct. 27, 2022, 6 pages.

* cited by examiner

Center = 1.4 mm

Edge = 10 mm

METHOD FOR FABRICATING MICROSTRUCTURED INSERTS FOR INJECTION MOLDING

CROSS-REFERENCE TO RELATED APPLICATIONS

This application is the U.S. national phase of International Application No. PCT/EP2022/069444 filed Jul. 12, 2022 which designated the U.S. and claims priority to EP 21305982.7 filed Jul. 13, 2021, the entire contents of each of which are hereby incorporated by reference.

FIELD

The present disclosure relates to method of fabricating a microstructured mold insert, in particular a glass mold insert having a microstructured resin film formed thereon for use in injection molding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Injection molding of lenses with a diverging geometry, for example, −0.25 to −8.00 diopter lenses, can present challenges that may introduce defects such as weld line and center distortion defects. FIG. 1 shows an exemplary cross-sectional schematic of an exemplary prescription lens. For example, the lens in FIG. 1 can be a −6.0 diopter lens having a center thickness of 1.4 mm while having an edge thickness of 10 mm. Injection molding of such a lens geometry can result in high levels of internal stress caused by the differential shrinkage of the thicker edge compared to the thin center.

FIG. 2A shows a series of optical images of a weld line defect forming during lens fabrication. FIG. 2B shows a center distortion defect. Some mold inserts can be used to reduce occurrence of said weld line and center distortion defects by using a material that has a very low thermal conductivity. This can prolong the initial cooling rates to hold the temperature of the polymer melt above the glass transition temperature (Tg) for a sufficient time and prolong solidification of the polymer melt. Conversely, metal inserts can immediately cool the polymer melt below Tg. The molecular chains are allowed to relax to reduce internal stress, and the weld line is fused together when the initial temperatures are held above Tg.

Microstructured mold inserts fabricated via imprinting can be cheap, accurate, flexible, reproducible, and rapidly produced. When coupled with a mold insert material that has a low thermal conductivity, this can result in a reduction of the quenching of the polymer being molded and a concomitant reduction in said weld line and center distortion defects. Thus, a method for forming a microstructured mold insert having a low thermal conductivity and durability to withstand repeated injection molding cycles for prolong use without cracking, chipping, or delamination is desired.

Aspects of the disclosure may address some of the above-described shortcomings in the art, particularly with the solutions set forth in the claims.

2

SUMMARY

The present disclosure relates to a method for forming a mold insert including forming a stamp, a surface of the stamp including a plurality of inverted microstructures formed thereon; and pressing the stamp into a film or medium disposed on a surface of a first mold insert to form a microstructured film, the microstructured film including a plurality of microstructures formed on a surface of the microstructured film based on the plurality of inverted microstructures, the plurality of microstructures being complementary to the plurality of inverted microstructures.

The present disclosure additionally relates to a molding apparatus, including a mold including a first mold insert and a second mold insert, the first mold insert including a microstructured film disposed on a surface of the first mold insert, the microstructured film including a plurality of microstructures formed thereon, wherein a material of the first mold insert is glass or metal and a material of the microstructured film is a resin, hybrid resin, or mineral film, preferably, SU-8.

Note that this summary section does not specify every feature and/or incrementally novel aspect of the present disclosure or claimed invention. Instead, this summary only provides a preliminary discussion of different embodiments and corresponding points of novelty. For additional details and/or possible perspectives of the embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein:

FIG. 5A shows an exemplary chemical structure for SU-8, within the scope of the present disclosure.

FIG. 5B shows an exemplary chemical structure for gamma-butyrolactone (GBL), within the scope of the present disclosure.

FIG. 15 shows a microscopy image and microstructure profile of an inverted microstructure obtained on the PDMS stamps used for Examples 6 to 12.

DETAILED DESCRIPTION

Figure 1:
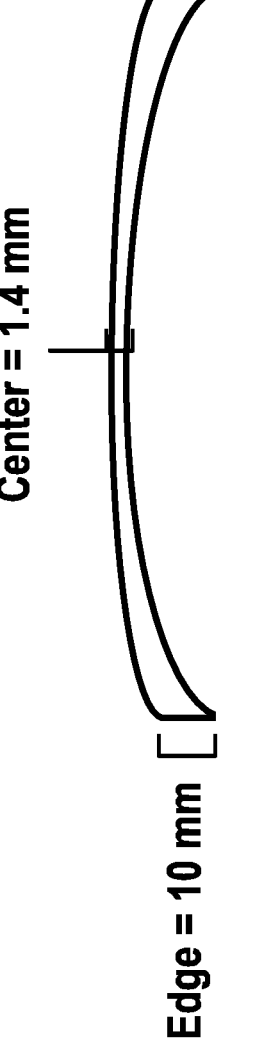
FIG. 1 shows an exemplary cross-sectional schematic of an exemplary prescription lens.
Figure 2A:
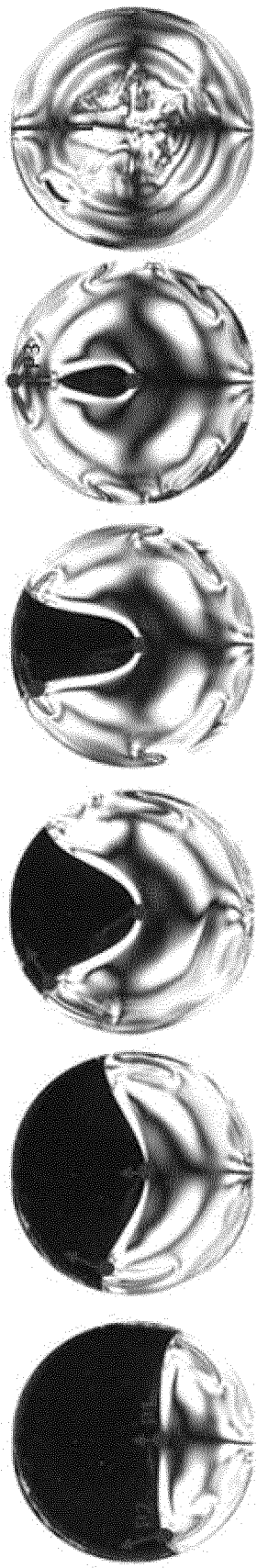
FIG. 2A shows a series of optical images of a weld line defect forming during lens fabrication.
Figure 2B:
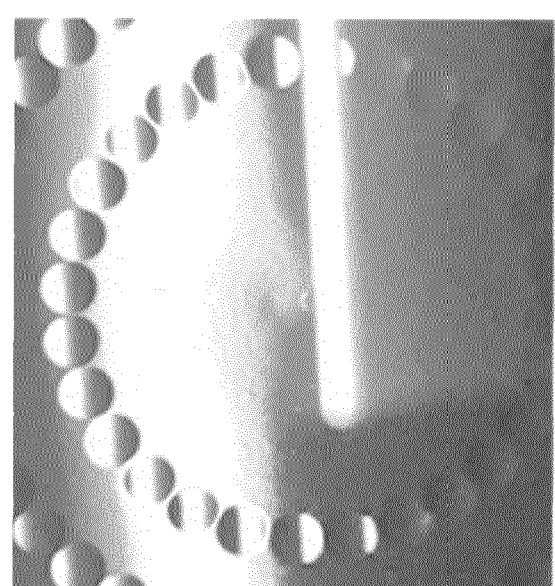
FIG. 2B shows a center distortion defect.

The following disclosure provides many different variations, or examples, for implementing different features of the provided subject matter. Specific examples of components and arrangements are described below to simplify the present disclosure. These are, of course, merely examples and are not intended to be limiting nor inoperable together in any permutation. Unless indicated otherwise, the features and embodiments described herein are operable together in any permutation. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. Inventive apparatuses may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

As previously mentioned, weld line and center distortion defects can occur during the molding process for lenses due to the increased cooling of an injected polymer melt. In general, weld lines can be formed during injection when an advancing polymer melt front meets another melt front, which can originate from filling a cavity of the mold from multiple gates. As such, this can lead to head-on impingement of separate flow fronts of the polymer melt, or splitting and converging of flow fronts due to presence of obstacles or excess transversal part thickness variation.

Figure 3A:
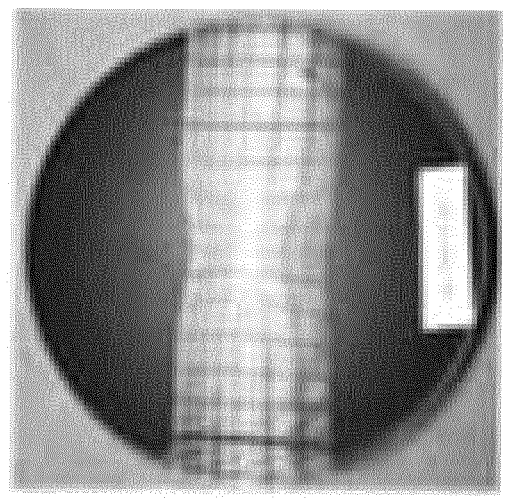
FIG. 3A shows an example of a center distortion defect on a lens.
Figure 3B:
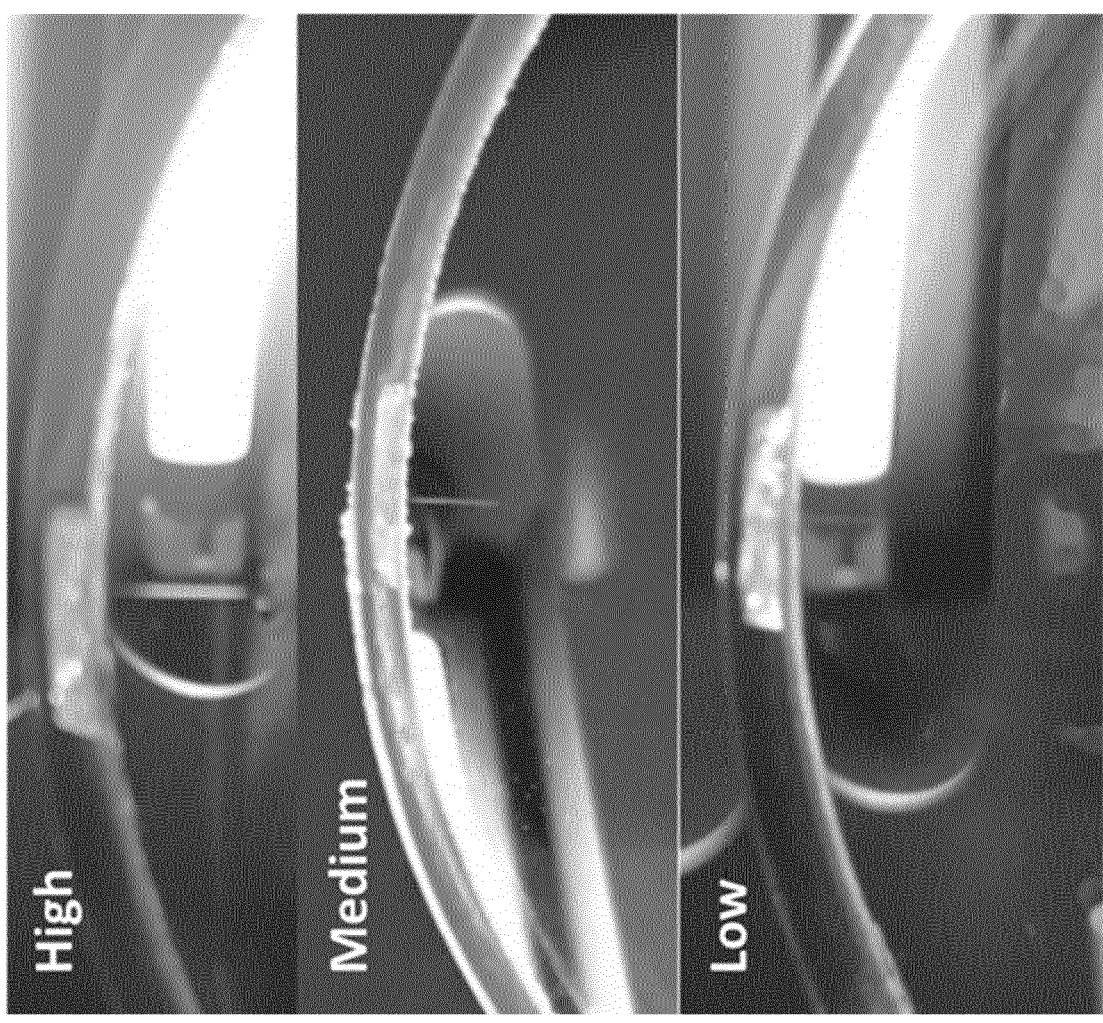
FIG. 3B shows optical images of weld line defect conditions.

As previously described, weld line and center distortion defects can occur during injection molding of a prescription lens due to an injected polymer melt cooling too quickly and when multiple flow fronts are present. For example, FIG. 3A shows an example of a center distortion defect on a −6.0D lens produced using metal inserts, and FIG. 3B shows optical images of weld line defect conditions obtained on −6.0D lenses produced using metal inserts.

Figure 4:
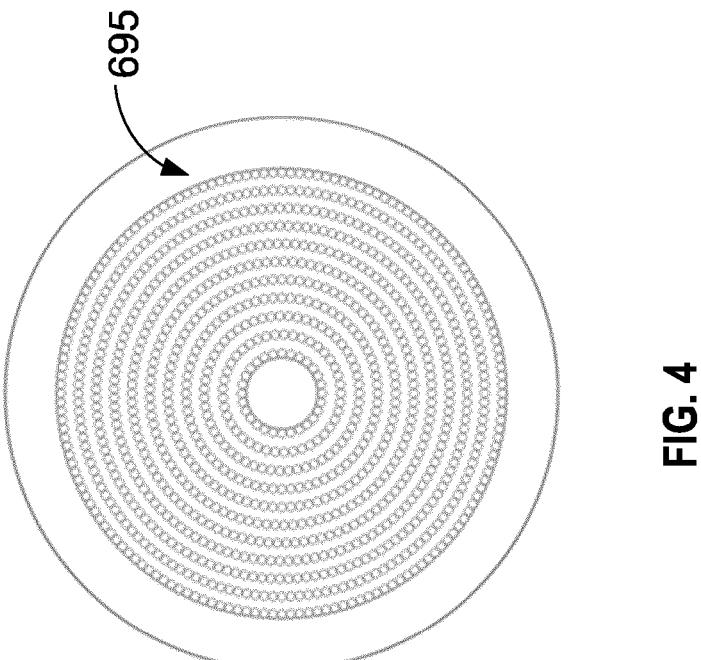
FIG. 4 shows an exemplary schematic of a mold insert including a plurality of microstructures formed thereon, within the scope of the present disclosure.

Metal inserts such as nickel phosphorus (NiP) plated steel inserts for injection molding can include a surface having diamond turned machined micro-structures. FIG. 4 shows an exemplary schematic of a mold insert including a plurality of microstructures 695 formed thereon, useful within the scope of the present disclosure. The plurality of microstructures 695 can be refractive, diffractive, or discontinuous over a portion or an entire surface of the insert. In an example, the mold insert can be copper and the plurality of microstructures 695 are formed using an alternative method to diamond turning, such as etching. In an example, the mold insert can be fused silica or a photo-sensitive resin and the plurality of microstructures 695 are formed via photolithography. Notably, based on the material, imprinting can also enable a large variety of designs on the surface of the mold inserts. The metal inserts can provide successful replication of optical microstructures on a lens for the application of myopia control. However, due to the higher thermal conductivity of the metal inserts, specific processing conditions with tighter tolerances can be needed to successfully transfer the pattern of the metal insert to a resulting lens while remaining defect-free. Thus, it can be difficult to injection mold lenses with different geometries within a multiple cavity mold since each geometry can include a different fabrication protocol with vary optimal parameters, while only a tight set of process parameters can be used with a particular metal insert within a multiple cavity mold. Instead, a mold insert having a lower thermal conductivity can afford expanded processing windows to allow for a wider range of lenses to be fabricated. This can provide increased flexibility during fabrication to increase efficiency and productivity, as well as ease of implementation across more products. Furthermore, using a resin as described herein to produce a microstructured insert copy can reduce the cost of fabricating additional copies of the mold insert made my machining NiP plated steel.

In a useful scope, a UV-sensitive resin or a resin including epoxy functionality can be used to form the mold insert. For example, the resin can be SU-8. The mold insert can be formed from a master, such as the NiP plated steel insert previously described having the plurality of microstructures 695 formed thereon. It may be appreciated that various types of masters can be used, such as other mold inserts used during injection molding.

As described herein, a resin, hybrid resin, or mineral oil film can be used to form a low thermal conductivity microstructured mold insert surface film copied from a microstructured NiP steel master that is used for injection molding. For example, SU-8 resin is used. A method including various processing steps and parameters is described to facilitate accurate replication of the plurality of microstructures 695 on the master. A description of the chemistry is described herein as well.

Figures 5A, 5B:
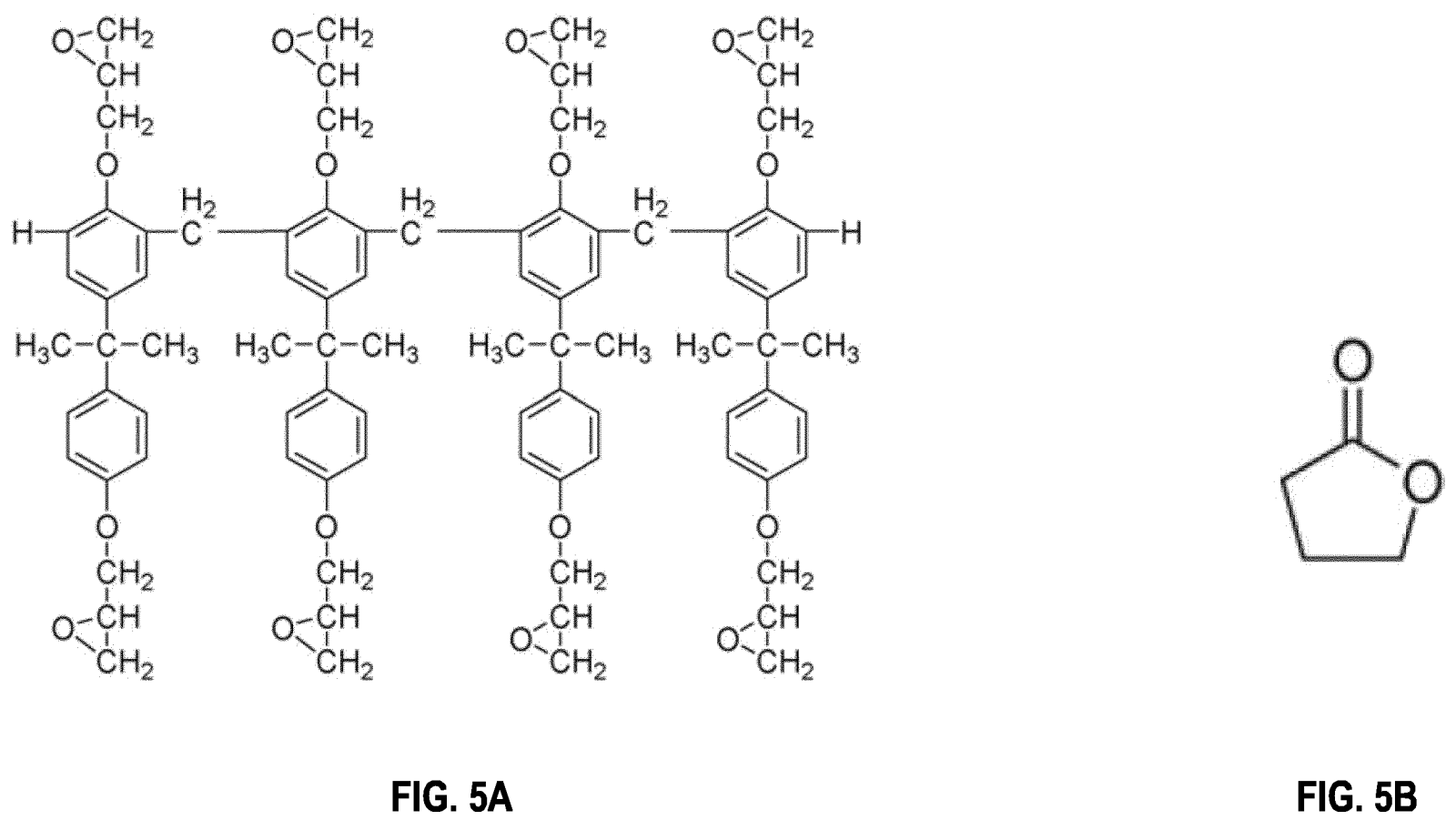

FIG. 5A shows an exemplary chemical structure for SU-8, useful within the scope of the present disclosure. SU-8 is an epoxy resin with an octafunctional epoxy molecule, and is sensitive to UV light and heat in the presence of properly selected cationic initiators.

FIG. 5B shows an exemplary chemical structure for gamma-butyrolactone (GBL), useful within the scope of the present disclosure. GBL is a reactive diluent mixed in with the SU-8 resin.

Figures 5C, 5D:
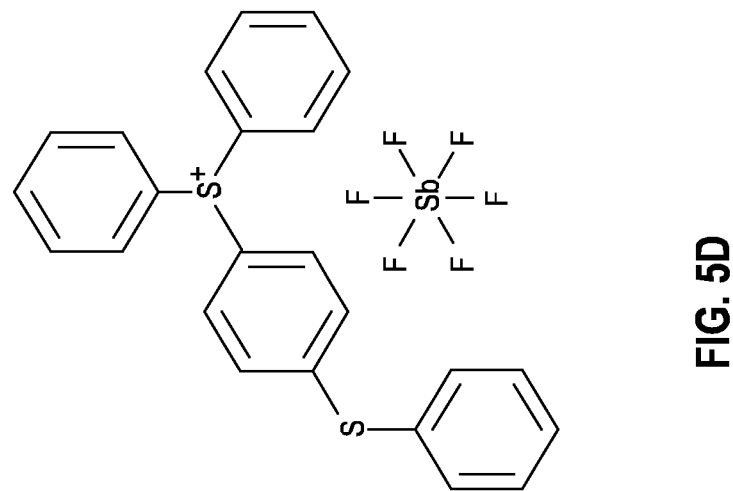
FIG. 5C shows an exemplary chemical structure for bis[4-(diphenylsulfonio)phenyl]sulfide bis(hexafluoroantimonate), within the scope of the present disclosure.
FIG. 5D shows an exemplary chemical structure for 4-thiophenyl phenyl diphenyl sulfonium hexafluoroantimonate, within the scope of the present disclosure.

FIG. 5C shows an chemical exemplary structure for bis[4-(diphenylsulfonio)phenyl]sulfide bis(hexafluoroantimonate), useful within the scope of the present disclosure.

The bis[4-(diphenylsulfonio)phenyl]sulfide bis(hexafluoroantimonate) is a photoinitiator mixed in with the SU-8 resin.

FIG. 5D shows an exemplary chemical structure for 4-thiophenyl phenyl diphenyl sulfonium hexafluoroantimonate, useful within the scope of the present disclosure. The 4-thiophenyl phenyl diphenyl sulfonium hexafluoroantimonate is also a photoinitiator mixed in with the SU-8 resin.

Of the above, the GBL is a reactive diluent that will undergo ring opening and reaction with epoxy groups during exposure to UV light. An amount of the GBL in a final cured film has an impact on a glass transition temperature (Tg) and a storage modulus of the film. The GBL can act as a bridge from one epoxy group to another either within a molecule of the SU-8 or from one molecule to another molecule of the SU-8. The final Tg can increase at lower amounts of the GBL, but can also become less tough and more difficult to fully cure. Therefore, the description set forth aims to describe an optimal concentration of the GBL and corresponding processing steps to provide a suitable microstructured insert for injection molding.

Figure 5E:
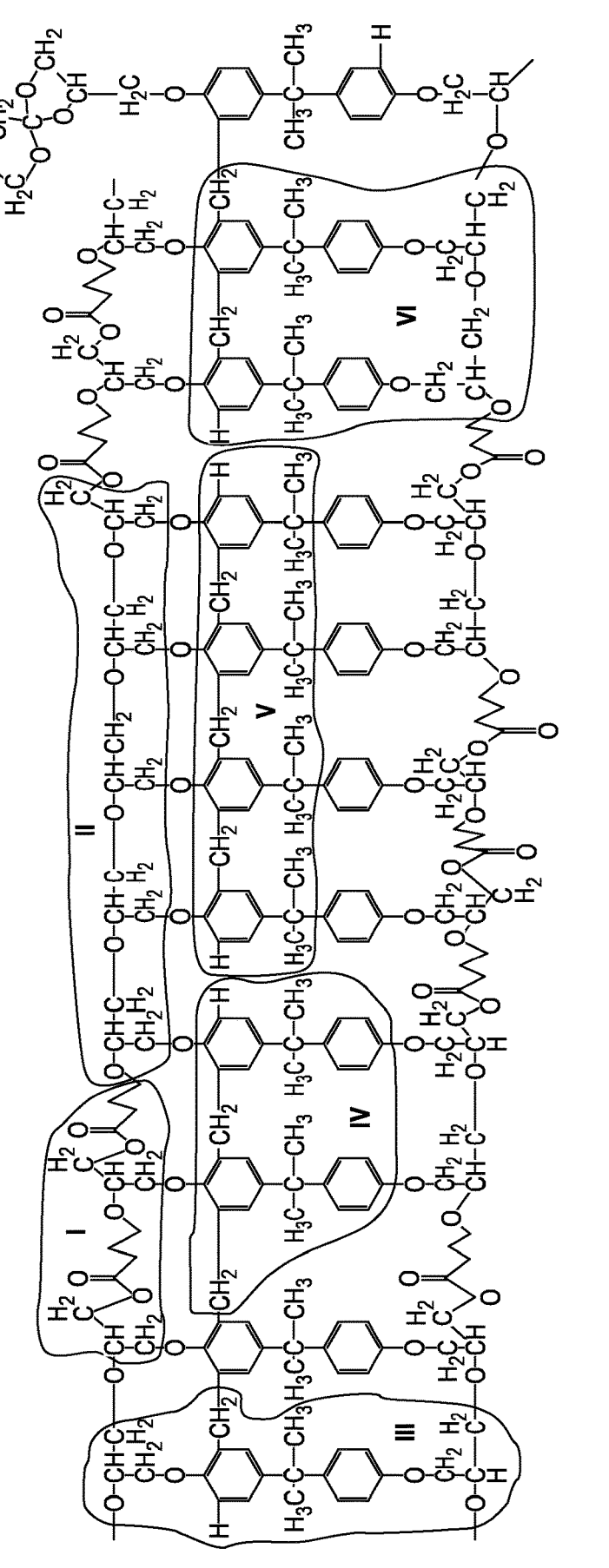
FIG. 5E shows an exemplary schematic of a cured network of the SU-8 including the GBL, within the scope of the present disclosure.

FIG. 5E shows an exemplary schematic of a cured network of the SU-8 including the GBL, useful within the scope of the present disclosure. For example, the SU-8 network can include 0% to 50% GBL, or 0% to 40% GBL, or 0% to 30% GBL, or 0% to 20% GBL, or 0% to 10% GBL, or 0% GBL, or 33% GBL (as shown). In a useful scope, introducing more of the GBL can reduce the number of epoxy groups available, while including less of the GBL can increase the difficulty of the epoxy groups to react due to decreasing a mobility of the polymer network. For the latter, higher temperatures of post-bake can be used to fully react the epoxy (SU-8) groups, and in turn this will give a higher Tg to the mold insert.

In a useful scope, the mold insert having a microstructured film formed from SU-8 can have a thermal conductivity of 0.2 $Wm^{-1}K^{-1}$, a thermal expansion of less than 100 ppm/K, a Tg of 100° C. to undetectable based on a concentration of the GBL and a post bake, and a modulus of elasticity (Young's Modulus) of 4 to 5 GPa based on the concentration of the GBL and the post bake.

In a useful scope, the thermal expansion coefficient of the SU-8 film can be similar to a material of the mold insert or delamination could occur from the thermal shock of injection molding. Delamination can also occur during post bake if the shrinkage of SU-8 is excessive. For this reason, the insert base material, SU-8 film thickness, nanoparticle silica content in the SU-8, and the processing steps to prepare the cured SU-8 (i.e. GBL content and post-bake conditions) can be optimized for eventual injection molding. A fabrication process of the microstructured SU-8 film is now elucidated.

Figure 6A:
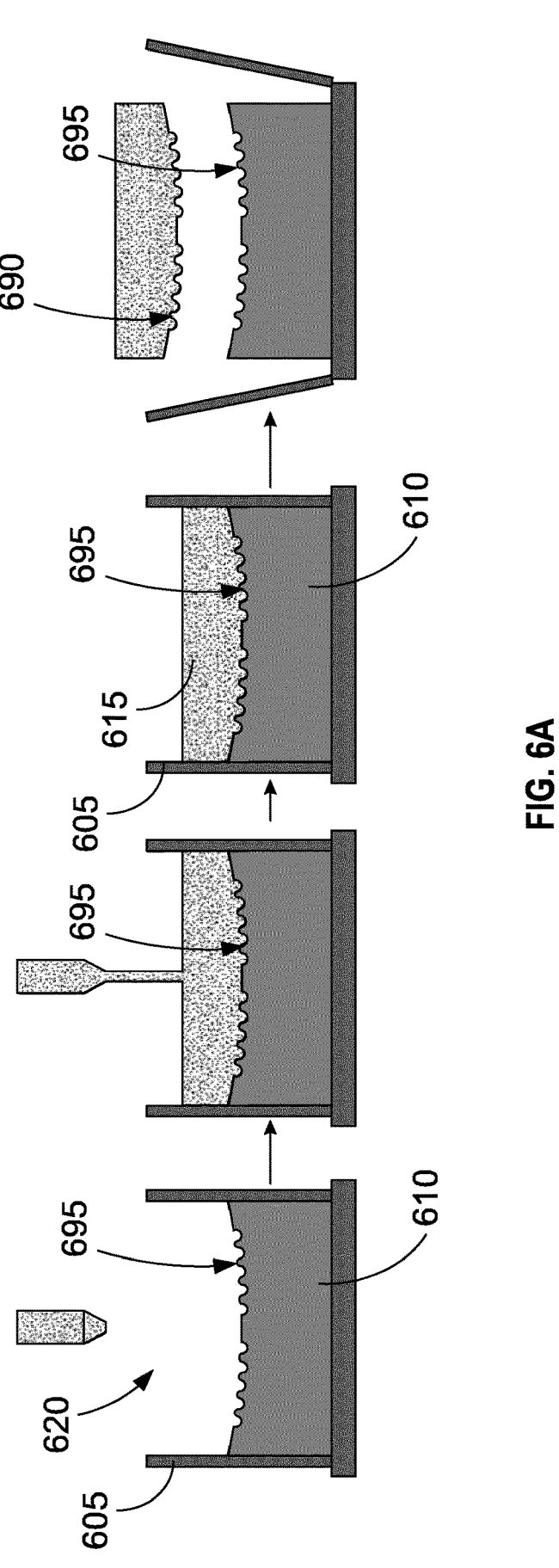
FIG. 6A shows an exemplary cross-sectional schematic of an exemplary stamp fabrication process, within the scope of the present disclosure.

FIG. 6A shows an exemplary cross-sectional schematic of an exemplary stamp fabrication process, useful within the scope of the present disclosure. In a useful scope, referring to the first step of FIG. 6A, a gasket 605, such as a tape, can be applied around a master mold 610 to form a well 620. For example, the master mold 610 is the NiP plated steel insert and includes a plurality of microstructures 695. As previous described, the plurality of microstructures 695 can be refractive, diffractive, or discontinuous over a portion or an entire surface of the insert. In an example, the master mold 610 can be copper and the plurality of microstructures 695 are formed using an alternative method to diamond turning, such as etching. In an example, the master mold 610 can be fused silica or a photo-sensitive resin and the plurality of microstructures 695 are formed via photolithography. In a second step of FIG. 6A, the well 620 can be filled with a thermoset resin. For example, the resin can be polydimethylsiloxane (PDMS). In a third step of FIG. 6A, the mold master and the thermoset resin filled in the well 620 can be cured in an oven to form a stamp 615. The thermoset resin can copy an inversion of the plurality of microstructures 695 on the surface of the master mold 610. In a fourth step of FIG. 6A, the gasket 605 can be removed and the stamp 615 can be released from the master, the stamp 615 replicating the surface of the master mold 610 to form the plurality of inverted microstructures 690.

Microstructures may include microlenses, microlenslets, bifocal lenses, or progressive lenses, or any other type of structure or elements having physical Z deformation/height between 0.1 μm and 50 μm and width/length between 0.5 μm to 3.0 mm. These structures preferably have periodical or pseudo periodical layout, but may also have randomized positions. The preferred layout for microstructures is a grid with constant grid step, honeycomb layout, multiple concentric rings, contiguous e.g. no space in between microstructures. These structures may provide optical wave front modification in intensity, curvature, or light deviation, where the intensity of wave front is configured such that structures may be absorptive and may locally absorb wave front intensity with a range from 0% to 100%, where the curvature is configured such that the structure may locally modify wave front curvature with a range of +/−20, 500, or 1000 Diopters, and light deviation is configured such that the structure may locally scatter light with angle ranging from +/−1° to +/−30°. A distance between structures may range from 0 (contiguous) to 3 times the structure in X and/or Y size (separate microstructures).

In the sense of the disclosure, two optical elements located on a surface of a lens substrate are contiguous if there is a path supported by said surface that links the two optical elements and if along said path one does not reach the basis surface on which the optical elements are located. According to another scope, the optical elements are contiguous over a pupil when the optical lens over said pupil comprises no refraction area having a refractive power based on a prescription for said eye of the wearer or a refraction area having a refractive power based on a prescription for said eye of the wearer consisting in a plurality of respectively independent island-shaped areas. According to another scope, the two optical elements are contiguous if there is a path linking the two optical elements along part of said path one may not measure the refractive power based on a prescription for the eye of the person. According to another scope, optical elements being contiguous can also be defined in a surfacic manner. A measured surface being between 3 mm² and 10 mm² is considered. The measured surface comprises a density of X optical elements per mm². If in said measured surface, at least 95% of the surface, preferably 98%, has an optical power different from the surface onto which the optical elements are located, said optical elements are considered to be contiguous.

Furthermore, microstructures which form a microstructured main surface of an ophthalmic lens substrate may include lenslets. Lenslets may form bumps and/or recesses (may be raised or recessed structures) at the main surface they are arranged onto. The outline of the lenslets may be round or polygonal, for example hexagonal. More particularly, lenslets may be microlenses. A microlens may be spherical, toric, or have an aspherical shape. A microlens may have a single focus point, or cylindrical power, or non-focusing point. Microlenses can be used to prevent progression of myopia or hyperopia. In that case, the base lens substrate comprises a base lens providing an optical power for correcting myopia or hyperopia, and the microlenses may provide respectively an optical power greater than the optical power of the base lens if the wearer has myopia, or an optical power lower than the optical power of the base lens if the wearer has hyperopia. Lenslets may also be Fresnel structures, diffractive structures such as microlenses defining each a Fresnel structure, permanent technical bumps (raised structures), or phase-shifting elements. It can also be a refractive optical element such as microprisms and a light-diffusing optical element such as small protuberances or cavities, or any type of element generating roughness on the substrate. It can also be π-Fresnel lenslets as described in US2021109379, i.e. Fresnel lenslets which phase function has π phase jumps at the nominal wavelength, as opposition to unifocal Fresnel lenses which phase jumps are multiple values of 2π. Such lenslets include structures that have a discontinuous shape. In other words, the shape of such structures may be described by an altitude function, in terms of distance from the base level of the main surface of the optical lens the lenslet belongs to, which exhibits a discontinuity, or which derivative exhibits a discontinuity. In a useful scope, the microstructure can be a branding mark, holographic mark, metasurface, or the like.

Lenslets may have a contour shape being inscribable in a circle having a diameter greater than or equal to 0.5 micrometers (μm) and smaller than or equal to 1.5 millimeters (mm). Lenslets may have a height, measured in a direction perpendicular to the main surface they are arranged onto, that is greater than or equal to 0.1 μm and less than or equal to 50 μm. Lenslets may have periodical or pseudo periodical layout but may also have randomized positions. One layout for lenslets is a grid with constant grid step, honeycomb layout, multiple concentric rings, contiguous e.g. no space in between microstructures. These structures may provide optical wave front modification in intensity, curvature, or light deviation, where the intensity of wave front is configured such that structures may be absorptive and may locally absorb wave front intensity with a range from 0% to 100%, where the curvature is configured such that the structure may locally modify wave front curvature with a range of +/−20, 500, or 1000 Diopters, and light deviation is configured such that the structure may locally scatter light with angle ranging from +/−1° to +/−30°. A distance between structures may range from 0 (contiguous) to 3 times the structure (separate microstructures).

Figure 6B:
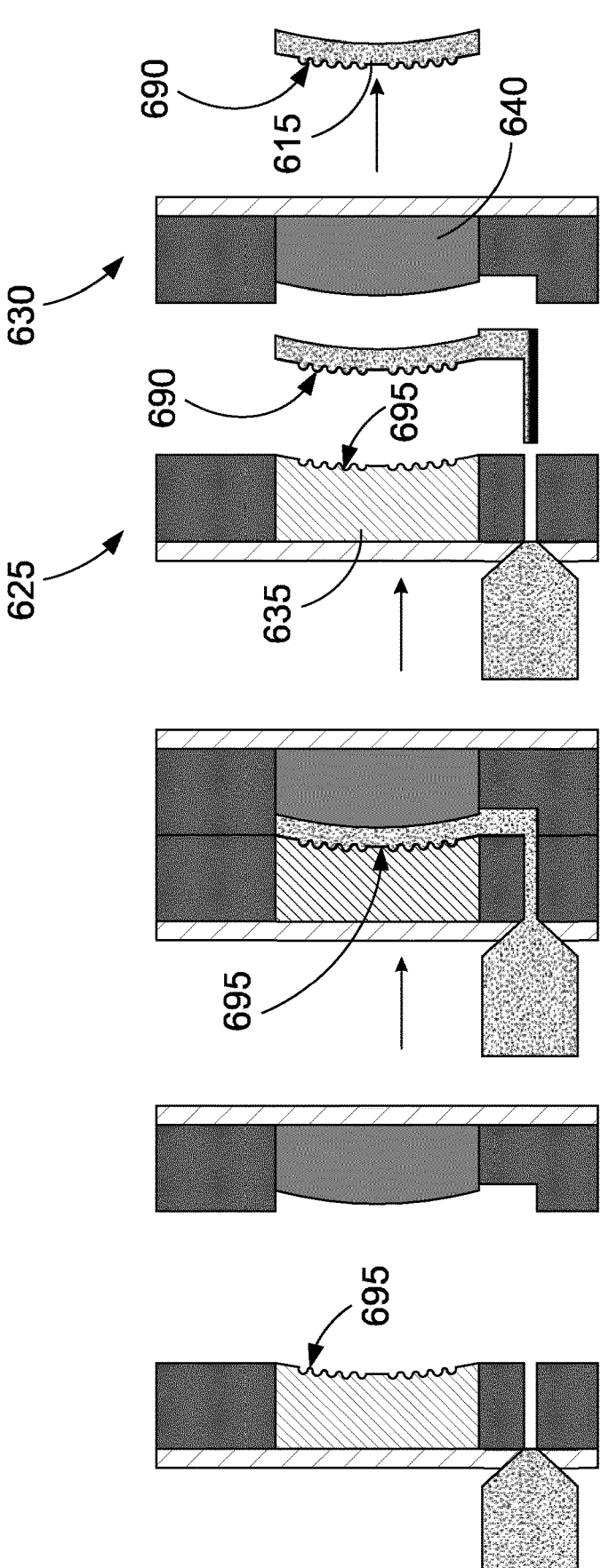
FIG. 6B shows an exemplary cross-sectional schematic of an exemplary stamp fabrication process via injection molding, within the scope of the present disclosure.

FIG. 6B shows an exemplary cross-sectional schematic of an exemplary stamp fabrication process via injection molding, useful within the scope of the present disclosure. In a useful scope, the master mold 610 is used as one side of a mold having a first mold side 625 and a second mold side 630. The mold can include a first mold insert 635 disposed on the first mold side 625 and a second mold insert 640 disposed on the second mold side 630. In a first step of FIG. 6B, the master mold 610 can replace the first mold insert 635 and be configured to couple with the second mold insert 640. In one example, the master mold 610 replacing the first mold insert 635 can be formed via die casting or CNC machining, or any other method known in the art, and subsequently diamond turned to produce the meta surface plurality of microstructures 695. In other examples, the plurality of microstructures 695 on the master mold 610 can be formed via processes such as etching, lithography, additive manufacturing, and imprinting, among others, based on a material of the master mold 610. The second mold insert 640 can be made via known methods in the art, such as CNC machining, die casting, or the like to form the complementary piece of the mold for injection molding. In a second step of FIG. 6B, the master mold 610 and the second mold insert 640 can be coupled to form a cavity and the thermoset resin can be injected into the cavity to form the stamp 615. In a third step of FIG. 6B, the thermoset resin can be cooled and then the stamp 615 can be released upon uncoupling the master mold 610 and the second mold insert 640.

Figure 6C:
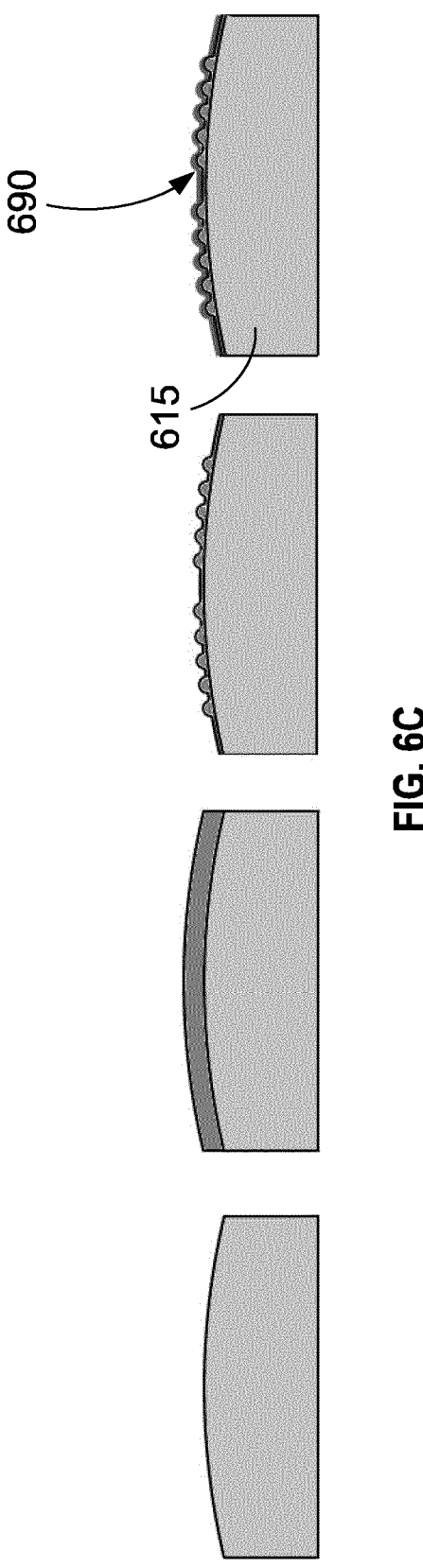
FIG. 6C shows an exemplary cross-sectional schematic of an exemplary stamp fabrication process via machining and deposition, within the scope of the present disclosure.

FIG. 6C shows an exemplary cross-sectional schematic of an exemplary stamp fabrication process via machining and deposition, useful within the scope of the present disclosure. In a useful scope, the stamp 615 can be formed via metal machining and vacuum depositions. In a first step of FIG. 6C, a metal blank is machined to a desired base curvature. In a second step of FIG. 6C, the metal blank can be plated with, for example, the NiP. In a third step of FIG. 6C, the plurality of inverted microstructures 690 can be machined into the NiP plating. In a fourth step of FIG. 6C, a low surface energy nanolayer thin film can be deposited on the NiP plating. For example, a vacuum deposition process can be performed, such as physical vapor deposition (PVD), chemical vapor deposition (CVD), electron beam evapora- tion, atomic layer deposition, sputtering, and plasma-en- hanced PVD, among others. It may be appreciated the stamp 615 can be formed via machining or a photolithography master as well. The stamp can be a membrane with a homogenous or non-homogenous thickness In a useful scope, a material of the stamp 615 can include any material that does not adhere strongly to SU-8 or the material of the master mold 610 while having sufficient rigidity, and replicates the plurality of microstructures 695 on the master mold 610 accurately. Examples of low surface energy stamp 615 materials made by casting or coating include PDMS, fluorinated ethylene propylene (FEP) and polyterafluoroethylene (PTFE). Examples of stamp 615 materials made by injection molding include polymethyl methacrylate (PMMA), cyclic olefin copolymer (COC), polymethyl pentene (PMP), and polystyrene. Notably, a layered version can include multiple layers of the aforemen- tioned materials in combination. For example, a 2-layer stamp 615 can include PMMA and PMP. The material of the stamp 615 can have an elastic modulus greater than 0.5 MPa. In a useful scope, a difference between a base curve of the stamp 615 from a base curve of the first mold insert 635 is within ±0.5 diopters. That is, the stamp 615 base curve can be slightly higher or lower than the mold insert 635 base curve to optimize replication, quality, etc. Other materials of the stamp 615 can include glass, steel, aluminum, or a metal allow.

Notably, FIG. 6C is an example of the NiP plated metal insert with a convex surface including the plurality of inverted microstructures 690 (not the plurality of micro- structures 695). This is an example of directly making a metal insert as the stamp 615 to eliminate either the casting/ coating or injection molding to make the stamp 615. There- fore the structures are inverted. The resin, such as the SU-8, may adhere to the NiP. Therefore, the NiP plating could be treated to lower the surface energy so that the SU-8 will not stick. Thus, a functional film can be applied by vacuum deposition by which the functional film has a low surface energy. For example, the surface energy for the stamp 615 (for FIGS. 6A-6C) can be less than 50 dynes/cm, or less than 40 dynes/cm, or 0 to 30 dynes/cm.

Figure 7:
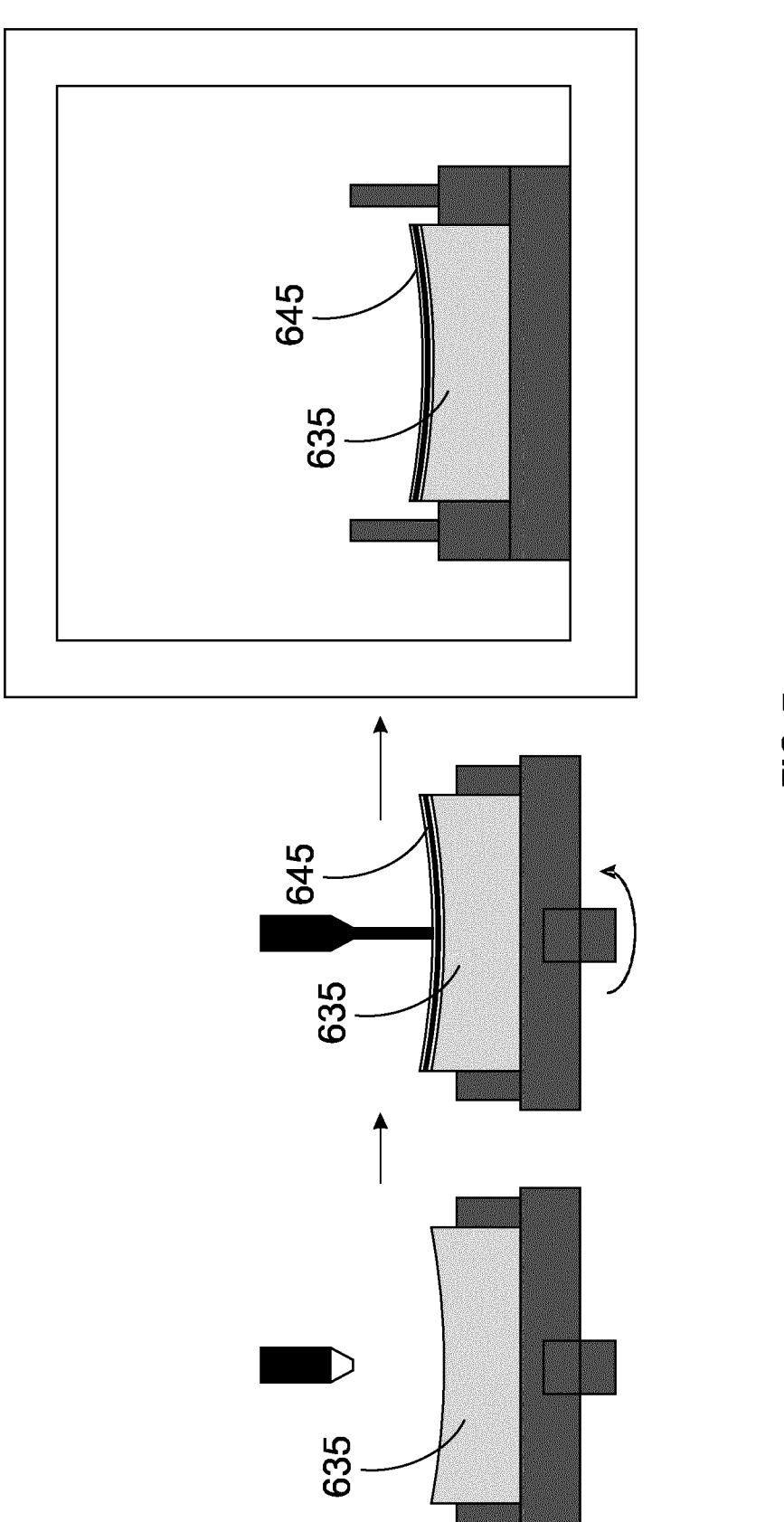
FIG. 7 shows an exemplary cross-sectional schematic of an exemplary resin film formation process, within the scope of the present disclosure.

With the stamp 615 formed, the first mold insert 635 surface can be modified to receive embossing of the plurality of inverted microstructures 690. To this end, FIG. 7 shows an exemplary cross-sectional schematic of an exemplary resin film formation process, useful within the scope of the present disclosure. In a first step of FIG. 7, the first mold insert 635 is arranged in a spin coating apparatus configured to rotate the first mold insert 635 about a rotation axis at a predetermined rotation speed. For example, the predeter- mined rotation speed can be in a range from 500 RPM to 10,000 RPM. The spin coating apparatus can ramp the predetermined rotation speed up and down over a length of time, and also hold the predetermined rotation speed for a length of time. That is, pre-defined spin curves can be used based on a desired coverage and thickness of a resulting resin film or medium 645. In a second step of FIG. 7, the resin can be deposited on a surface of the first mold insert 635 and the first mold insert 635 can be rotated at the predetermined rotation speed or the pre-defined spin curve to form the resin film or medium 645. In a third step of FIG. 7, the resin film or medium 645 can be soft baked in an oven to remove solvents from the resin film or medium 645.

As previously mentioned, the spin speed and, addition- ally, the GBL content can determine the thickness of the resin film or medium 645. For example, with a GBL content near 40%, the thickness can be 20 μm at 1500 RPM, or 10 μm at 3000 RPM. Lower thicknesses can be achieved at higher GBL content. The soft bake in the oven can facilitate removal/evaporation of the GBL from the resin film or medium 645. It may be appreciated that the aforementioned steps can be repeated to build up the final layer thickness of the resin film or medium 645 in a step-wise manner. Coating the medium 645 via, for example, doctor blading, inkjet printing, dip casting, spray coating, spin coating, film coat- ing, or lamination can result in a thickness of between 0.1 μm and 300 μm.

Furthermore, other processes can be performed to improve coating quality and adhesion to desired surfaces. For example, plasma treatment of the first mold insert 635 and/or incorporation of solvents into the resin formula can improve wettability to control pinhole type coating issues.

Figure 8:
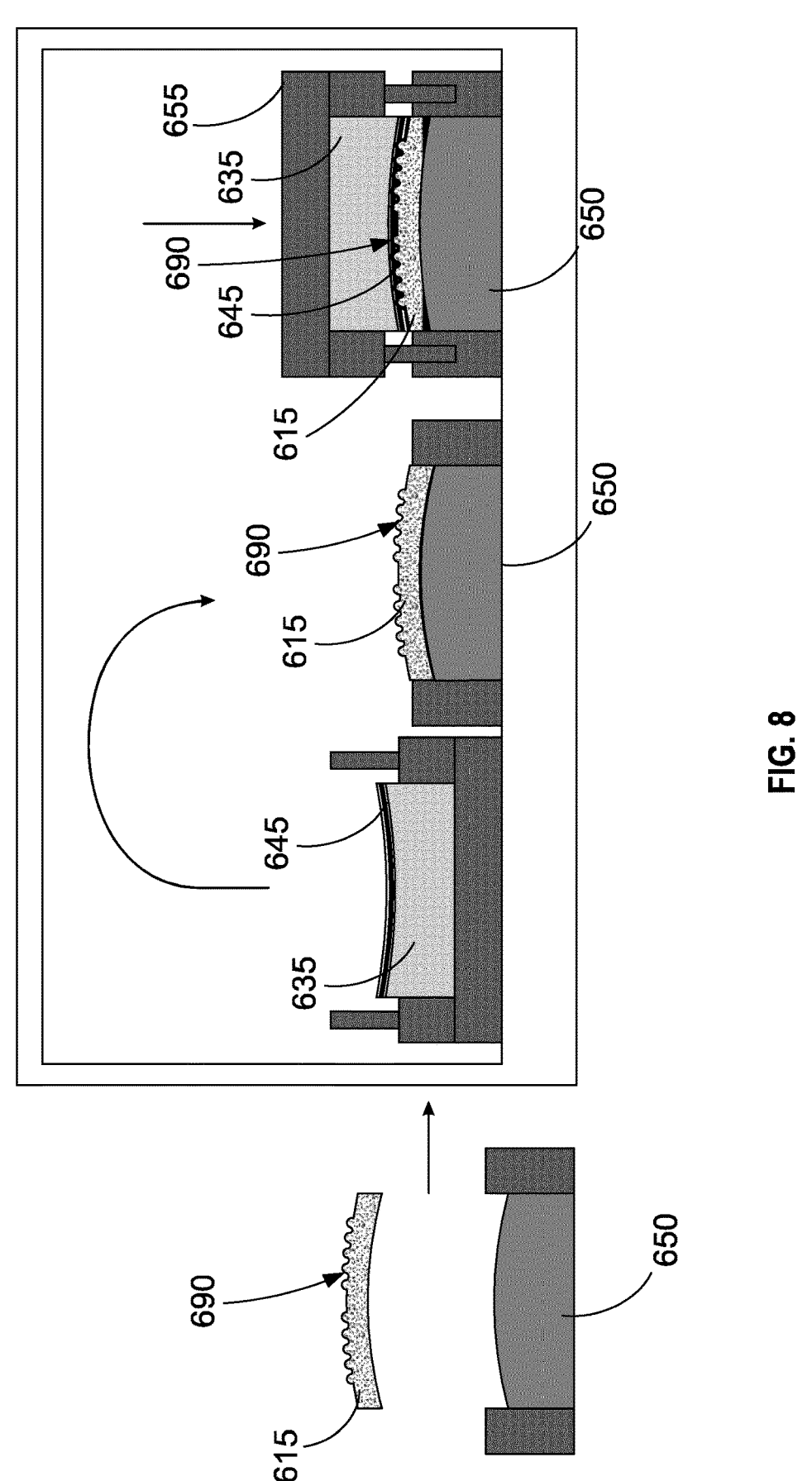
FIG. 8 shows an exemplary cross-sectional schematic of an exemplary resin film imprinting process, within the scope of the present disclosure.

FIG. 8 shows an exemplary cross-sectional schematic of an exemplary resin film or medium 645 imprinting process, useful within the scope of the present disclosure. Heat can be applied to soften the uncured resin film or medium 645 to facilitate improved replication accuracy of the stamp 615. For example, heat between 10° C. to 250° C., or 15° C. to 200° C., or 50° C. to 180° C. can be applied to improve replication quality of the plurality of microstructures 695 (that is, the stamp 615 including the plurality of inverted microstructures 690 will imprint into the resin film or medium 645 to transfer the pattern of the plurality of microstructures 695). The replication can be optimized with the appropriate pressure and temperature versus time profile. For example, pressures between 1 to 8000 psi, or more than 8000 psi, can be used depending on the temperature used and size of the microstructure. The stamp 615 material's elastic modulus (or, rigidity) can be high enough not to deform during these applied pressures during stamping, otherwise the plurality of microstructures 695 may not replicate well if the stamp 615 deforms. For example, an elastic modulus between 2 MPA and 200 GPA can be required for the stamp 615 material exposed to these pres- sures.

Additionally, alignment is important to maintain the pat- tern and concentric arrangement of the plurality of micro- structures 695 with the optical center of the first mold insert 635. To this end, the stamp 615 can be placed on a first fixture 650 and the first mold insert 635 coated with the resin film or medium 645 can be placed on a second fixture 655. Note that the medium 645 is pressable with a stamp such as stamp 615 to get a coating or film configuration. Both the stamp 615 on the first fixture 650 and the first mold insert 635 on the second fixture 655 can be disposed in an oven during imprinting, as shown in FIG. 8. The first fixture 650 and the second fixture 655 can include features configured to couple while maintaining an alignment of the first fixture 650 to the second fixture 655. For example, the first fixture 650 can include alignment holes and the second fixture 655 can include alignment posts, wherein inserting the alignment posts into the alignment holes can facilitate aligning a center of the first fixture 650 and a center of the second fixture 655 during coupling of the first fixture 650 to the second fixture 655 (and the respective stamp 615 and first mold insert 635 attached). It may be appreciated that the first fixture 650 and the second fixture 655 need not be used if an operator is capable of maintaining center alignment of the stamp 615 and the first mold insert 635 during imprinting. As shown in FIG. 8, the stamp 615 can be pressed into the resin film or medium 645 to form the first mold insert 635 having the microstructured surface.

Figure 9:
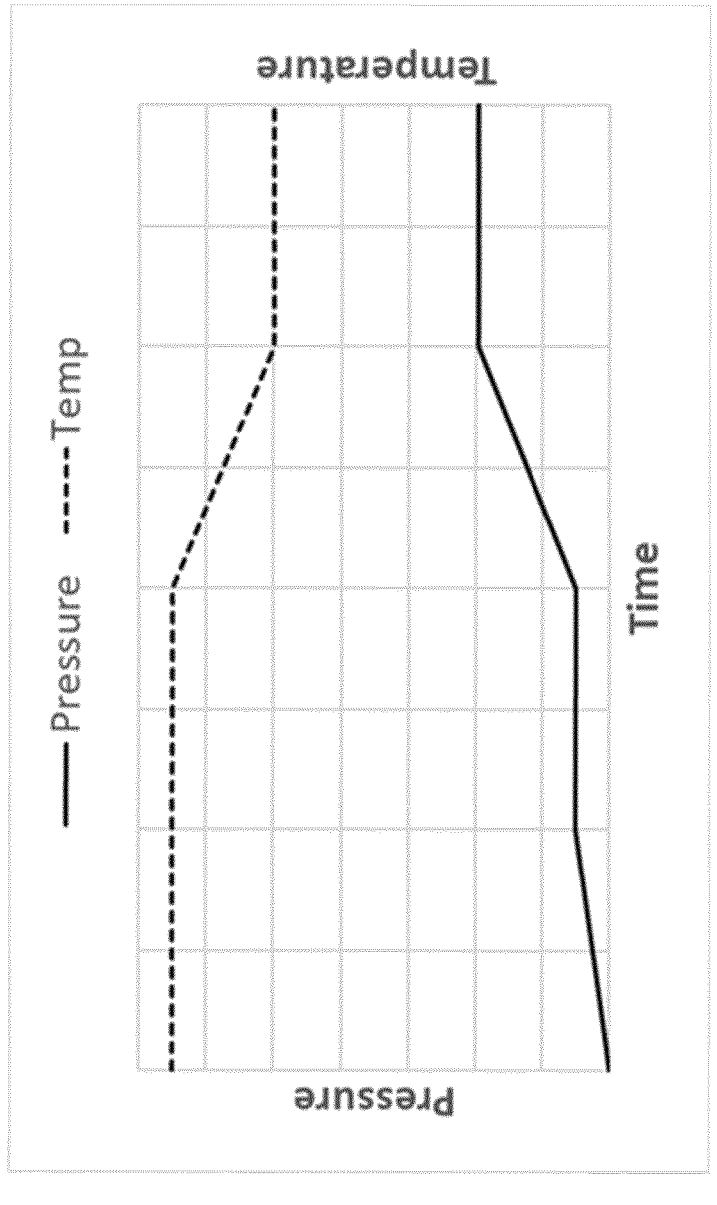
FIG. 9 shows an exemplary chart of an exemplary pressure and temperature profile, within the scope of the present disclosure.

FIG. 9 shows an exemplary chart of an exemplary pressure and temperature profile, useful within the scope of the present disclosure. A pressure of the stamp 615 pressed into the resin layer can be maintained with any mechanism. For example, the pressure can be applied against the stamp 615 using a pneumatic or hydraulic piston or flexible bladder. A flexible bladder could facilitate a uniform pressure so that the force vector is normal to the first mold insert 635 base curve at all areas of the stamp 615. Furthermore, a temperature and pressure profile can be optimized to provide the best replication. For example, FIG. 9 shows a profile that is not static but dynamic with pressures and temperatures changing throughout the cycle.

Additionally, the entire stamping process can be automated with machine control and design to achieve precise timing of the heat and pressure. For example, the resin film or medium 645 and the stamp 615 can be preheated after soft bake under infrared (IR) type heaters. The IR heaters can then be immediately removed mechanically or robotically after which the stamping step is promptly performed. This can allow for faster cooling of the stamped resin film or medium 645 and facilitate more precise temperature and pressure versus time profiles.

Figure 10:
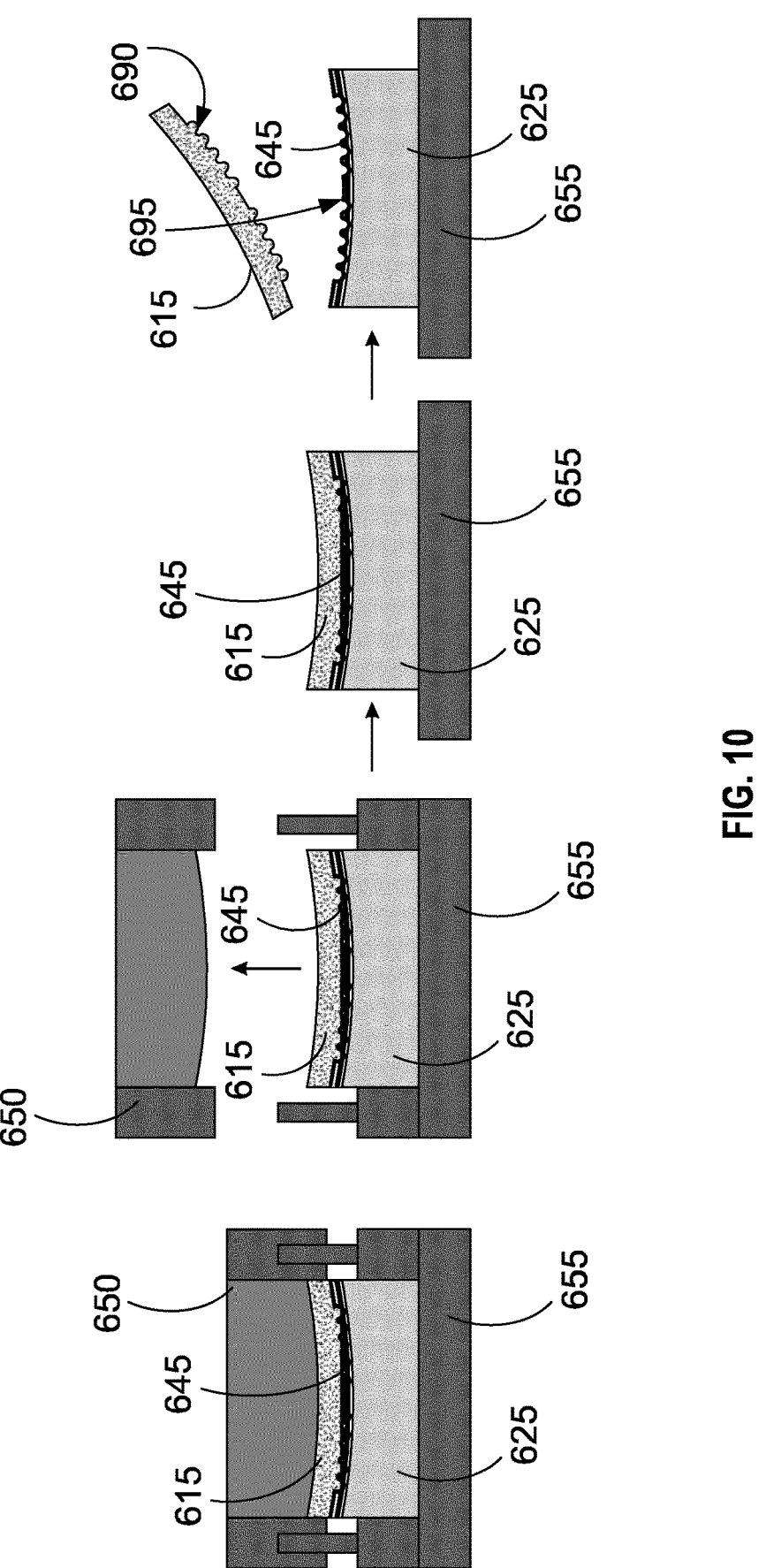
FIG. 10 shows an exemplary cross-sectional schematic of an exemplary stamp release process, within the scope of the present disclosure.

FIG. 10 shows an exemplary cross-sectional schematic of an exemplary stamp release process, useful within the scope of the present disclosure. At room temperature, the uncured resin film or medium 645 can be glassy and the stamp 615 can be removed. For example, the adhesion of a PDMS stamp 615 to an SU-8 resin film or medium 645 can increase after UV exposure. Therefore, the PDMS stamp 615 removal can be preferred prior to curing the SU-8 resin film or medium 645. In general, the stamp 615 can have a low surface energy to release from the surface of the resin film or medium 645. Alternatively, the stamp 615 can be made of metal and then vacuum coated with a thicker release nanolayer. This can provide a stamp 615 that has both a very high modulus suitable for extreme range of pressures of stamping and also very good release properties to release from the SU-8 resin film or medium 645. It is an advantage of imprinting to be able to bring a large variety of design on the surface of mold inserts.

Furthermore, the ability for the stamp 615 to be removed prior to UV exposure means the stamp 615 does not require high transparency to UV. However, if it becomes desirable to remove the stamp 615 after UV exposure, then the stamp 615 must have high transparency to UV exposure.

In a useful scope, the resin film or medium 645 can be formed on a secondary assembly, such as a glass mold part and the stamp 615 can be pressed into the resin film or medium 645 on the secondary assembly. In turn, the secondary assembly can be inserted adjacent to the first mold insert during injection molding to provide a removable and swappable microstructured secondary assembly. Furthermore, the secondary assembly can provide flexibility and ease of use during fabrication, such as during spin coating or baking. The secondary assembly can also provide the advantage of being easily replaced as compared to the first mold insert 635.

Figure 11:
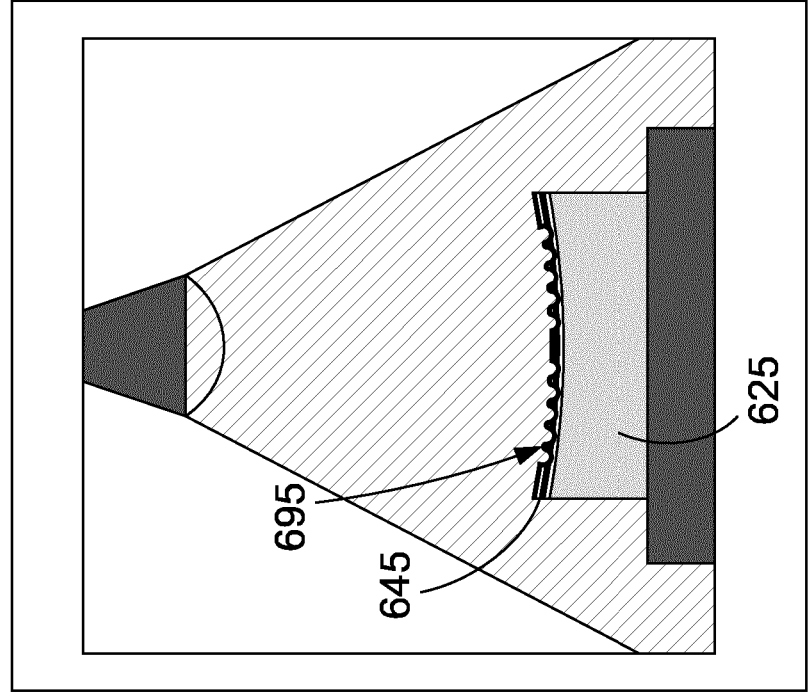
FIG. 11 shows an exemplary cross-sectional schematic of an exemplary mold insert undergoing UV cure, within the scope of the present disclosure.
Figure 11:
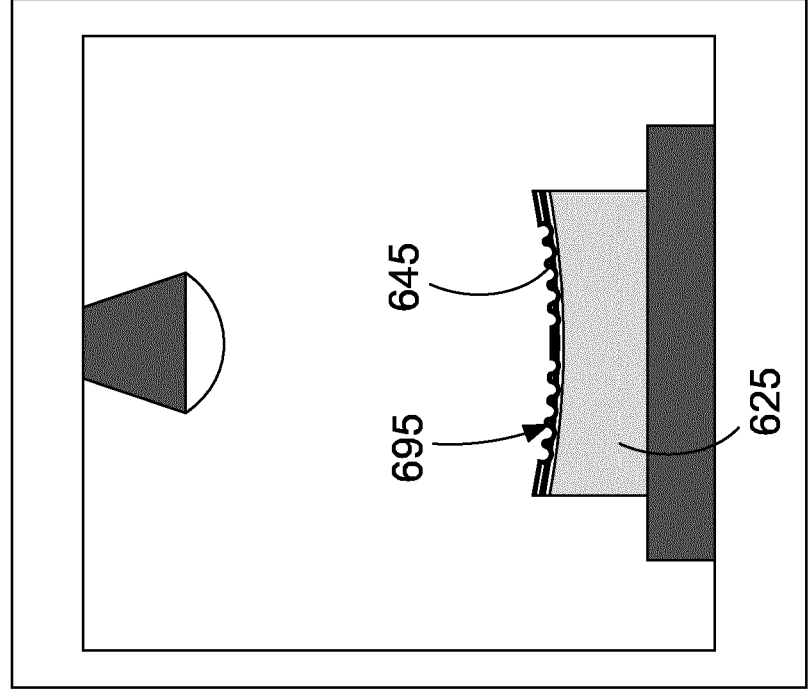

FIG. 11 shows an exemplary cross-sectional schematic of an exemplary mold insert undergoing UV cure, useful within the scope of the present disclosure. In a useful scope, the first mold insert 635 with the microstructured resin film or medium 645 can be UV cured. As previously mentioned, a high UV transparency material for the stamp 615 can be used to allow for the stamp 615 to remain pressed into the resin film or medium 645 during UV curing. Near UV (e.g., 350-400 nm) with exposure energy between 0.2 to 10 J/cm$^2$ can be used during development. Alternatively, a pulsed UV system can be used to avoid overheating and distortion of the microstructured resin film or medium 645. Curing the medium 645 and post-baking the medium 645 can result in a thickness of between 0.1 μm and 300 μm.

Figure 12:
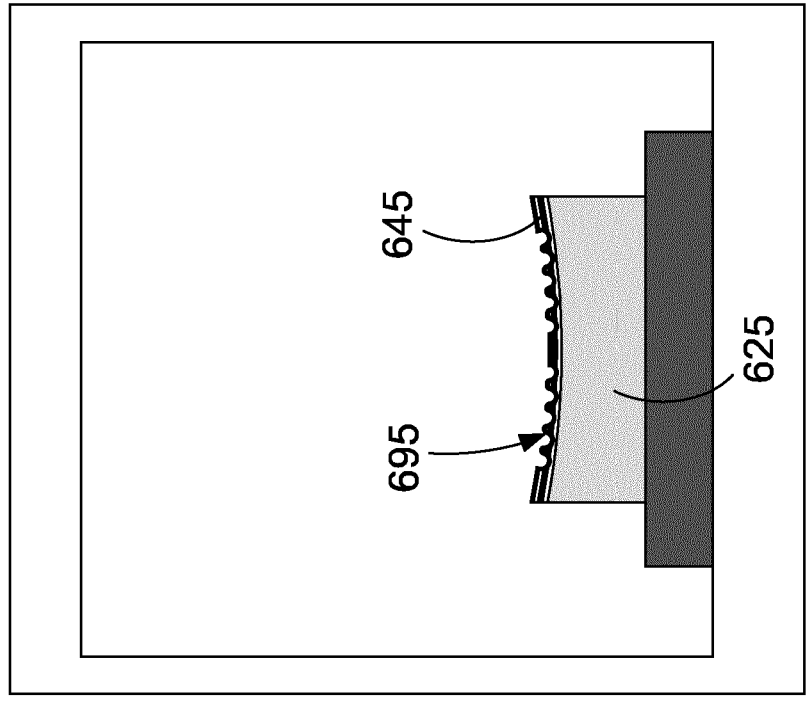
FIG. 12 shows an exemplary cross-sectional schematic of an exemplary mold insert undergoing a post exposure bake (PEB), within the scope of the present disclosure.

FIG. 12 shows an exemplary cross-sectional schematic of an exemplary mold insert undergoing a post exposure bake (PEB), useful within the scope of the present disclosure. In a useful scope, the first mold insert 635 with the microstructured resin film or medium 645 can be baked to completely cross-link the epoxy groups in the resin film or medium 645. This can help solidify the plurality of microstructures 695, which can again help imbue them with the refractive or diffractive properties. Again, this pattern can be discontinuous over a portion or an entire surface of the first mold insert 635. During UV exposure, only some of the epoxy groups are cross-linked because the network becomes too rigid preventing unreacted epoxy groups from coming into contact. With sufficient PEB, the increased conversion of epoxy cross-linking improves properties such as Tg. However, if PEB temperatures are excessive, then the epoxy cross-link conversion will be too high causing excessive shrinkage, build-up of stress, and potentially deformation of microstructures, or delamination of the microstructured resin film or medium 645 from the first mold insert 635.

Figure 13A:
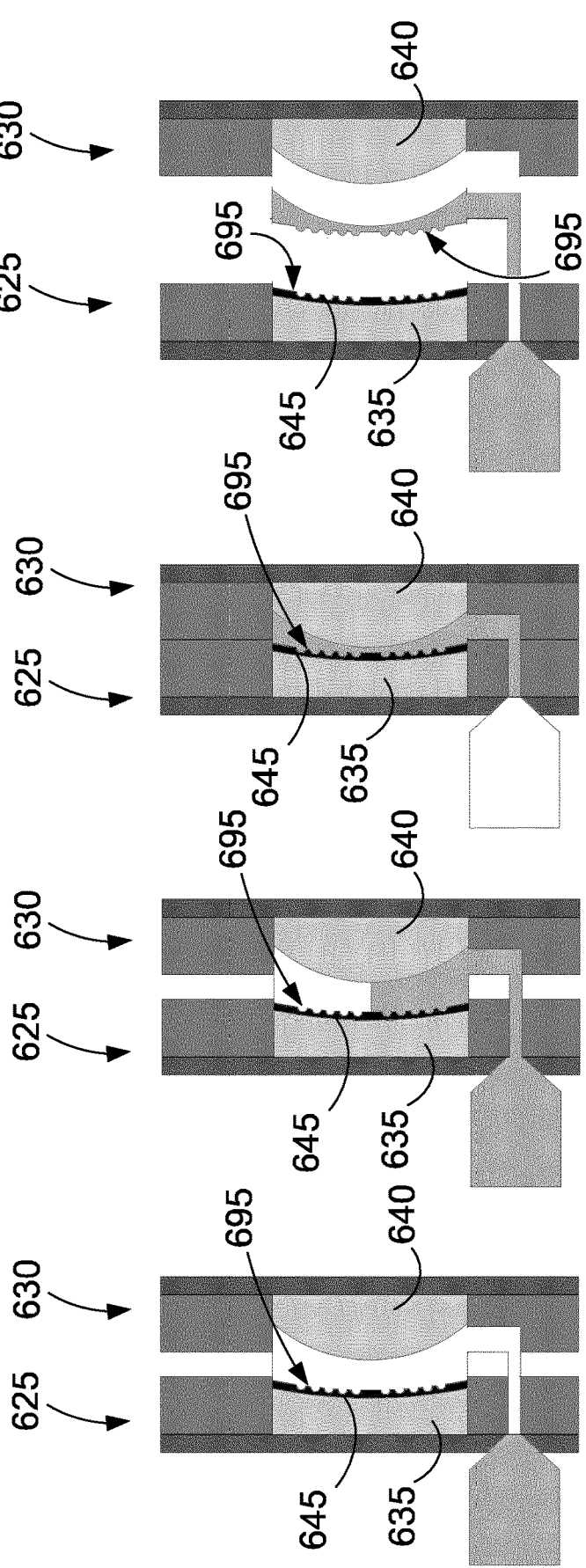
FIG. 13A shows an exemplary cross-sectional schematic of an exemplary injection molding process using the first mold insert with the microstructured resin film, within the scope of the present disclosure.

FIG. 13A shows an exemplary cross-sectional schematic of an exemplary injection molding process using the first mold insert 635 with the microstructured resin film or medium 645, useful within the scope of the present disclosure. In a useful scope, a microstructured lens can then be produced by injection molding using the microstructured first mold insert 635 on the first mold side (front, concave side) with a glass convex insert on the second mold side 630 (back side). In a first step, the first mold insert 635 can be coupled with the second mold insert 640 in the mold to form a cavity. In a second step, a polymer melt, such as polycarbonate, can be injected into the cavity. In a third step, the first mold insert 635 and the second mold insert 640 can be fully coupled if not fully coupled in the first step. In a fourth step, the mold can be opened upon sufficient cooling of the polymer melt, and a lens including a microstructured surface can be removed.

In a useful scope, the master mold 610 can be used to form the stamp 615 and the stamp 615 can be used to directly modify the surface of the finished lens. In a first step, the master mold 610 can be arranged in a container or have the gasket 605 formed around the master mold 610. In a second step, a material for the stamp 615, such as PDMS, can be poured over the master mold 610. Subsequently, for the master mold 610 arranged in the container, the hardened PDMS can be removed as a large sheet that conformed to the shape of the container and the desired area for the stamp 615 can be cut or shaped from the large sheet of PDMS. For the master mold 610 having the gasket 605 formed, the PDMS stamp 615 can be peeled from the surface of the master mold 610. In a third step, the PDMS stamp 615 can be pressed into a hard coat medium on the substrate (e.g. the lens) to imprint the stamp 615 into the hard coat medium on the substrate. For example, a drop of the hard coat medium solution can be dropped onto the surface of the lens, and then the PDMS stamp 615 can be arranged on the drop of the hard coat medium to ensure all of the features of the PDMS stamp 615 are filled sufficiently with the hard coat medium solution. In a fourth step, the hard coat medium can be polymerized, for example via UV light, to solidify the features imparted by the stamp 615. Notably, PDMS is UV transparent and the PDMS stamp 615 can remain pressed into the surface of the lens. In a fifth step, the PDMS stamp 615 can be delaminated or separated from the surface of the lens and the now polymerized and solidified hard coat medium having microstructures formed therein based on a complementary pattern of the stamp 615. In a sixth step, the lens having the microstructured hard coat medium formed thereon can be finished via various manufacturing methods to form the desired finished lens shape, thickness, prescription, and coating, among others. Additional coatings can include, for example, anti-reflective coatings and anti-smudging coatings. Notably, the additional method described herein can prevent exposing the stamp 615 and molding materials to the potential high temperature environment of injection molding. Instead, a lower temperature polymerization can be performed via UV light exposure.

In a useful scope, the first mold insert 635 with the microstructured resin film or medium 645 can be used for injection molding as described, or used for a casting process to fabricate the desired lens. That is, similar to how the gasket 605 was formed to fabricate the stamp 615, a similar processes can be performed using the first mold insert 635 with the microstructured resin film or medium 645 to cast the desired lens. Furthermore, the injection molded or cast lens can be a semi-finished or finished lens. Additionally, in a useful scope, the molded or cast part can be simply a film or a wafer substrate. In a useful scope, a curvature of the stamp 615 and the first mold insert 635 can be spheric, aspheric, concave, convex, flat, or progressive. While the stamp 615 described and illustrated in the figures herein is shown as being equal in area to the first mold insert 635, it may be appreciated that an area of the stamp 615 can be larger or smaller than a surface of the first mold insert 635.

In a useful scope, the microstructured resin film or medium 645 can be transferred from the first mold insert 635 to the lens during molding. The injected polymer melt can then encapsulate the microstructured resin film or medium 645 and retain the microstructured resin film or medium 645 on a surface of the lens.

In a useful scope, forming the lens can include additional adjustments to the formed lens based on metrology results of formed lens after a first cycle. That is, after, for example, injection molding, the mold can be opened to remove the molded lens. Since the master mold 610 can be flat while the finished lens can be curved, some adjustments may be needed to compensate for the deformation of the plurality of microstructures 690 potentially introduced by the stamp 615 and finished lens mismatch. For example, the resulting microstructures on the curved lens may differ from the structure on the (flat) master mold 610 in terms of x-axis and y-axis positions, and in terms of shape, and in terms of depth or height along the z-axis (i.e. orthogonal to a plane of the surface of the lens). Shrinkage of the injected polymer, stamp material, or the resin imprinted on the mold insert surface can, for example, reduce microstructure depth or height and lead to a change in optical power or repartition of optical energy in the diffraction orders. As such, a thickness of the molded lens can be determined and, and upon determining a thickness (or any other dimension) of the molded lens is below a predetermine threshold, the molded lens can be inserted into the cavity again a second cycle can be performed. That is, the polymer melt can be injected once more into the cavity including the molded lens. The thickness (or any other dimension) of the molded lens after the first cycle can be less than desired due to various factors including, for example, shrinkage and contraction of the polymer upon cooling. Thus, the second cycle can reduce the variance introduced via such example factors. Additionally, compensation can be incorporated into the dimension of the master mold 610 (e.g. during photolithography fabrication of the master mold 610) and subsequently the stamp 615 for microstructure height.

Figure 13B:
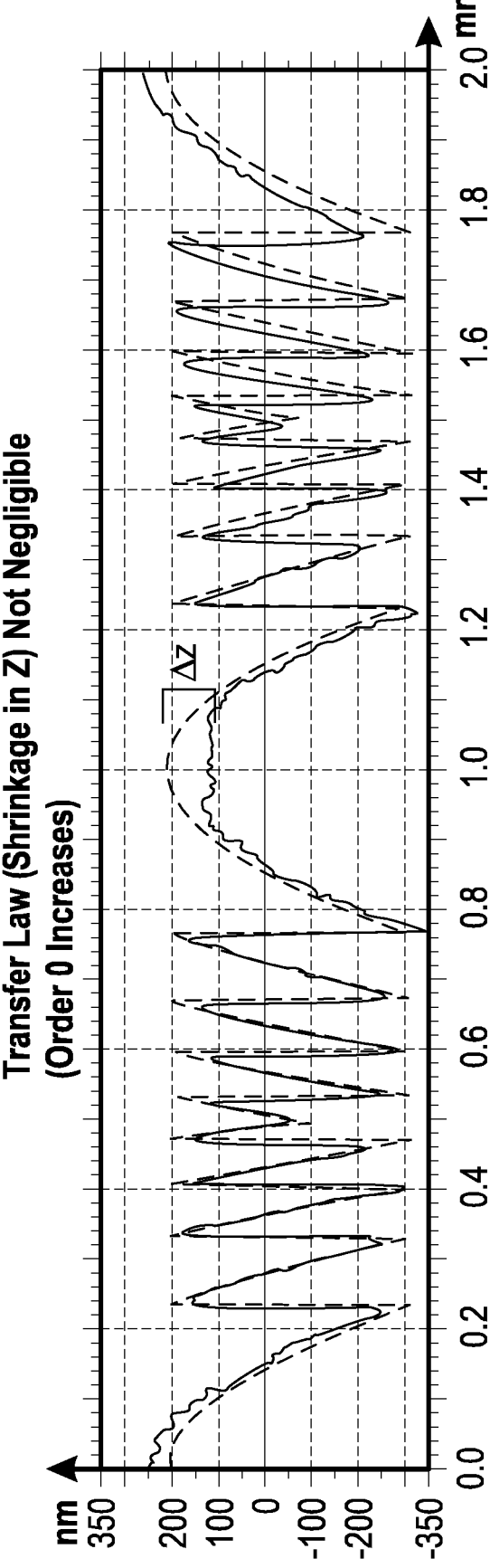
FIG. 13B shows an exemplary cross-sectional profile of two microstructures, within the scope of the present disclosure.

FIG. 13B shows an exemplary cross-sectional profile of two microstructures, useful within the scope of the present disclosure. As shown, the "ΔZ" label indicates the difference between the expected, theoretical microstructure profile and the obtained microstructure profile, wherein the lower of the two curves is the obtained microstructure profile that exhibits shrinkage and thus is not as deep or tall. Thus, this difference can be accounted for and compensated for during fabrication of the master mold 610. Additionally, the hard coat medium solution can be changed to use one with a higher refractive index to compensate, such that the energy of order will adjust accordingly to the obtained microstructures. For example, an energy of order +1 will be increased when an energy of order 0 will be decreased.

EXAMPLES

Figure 14:
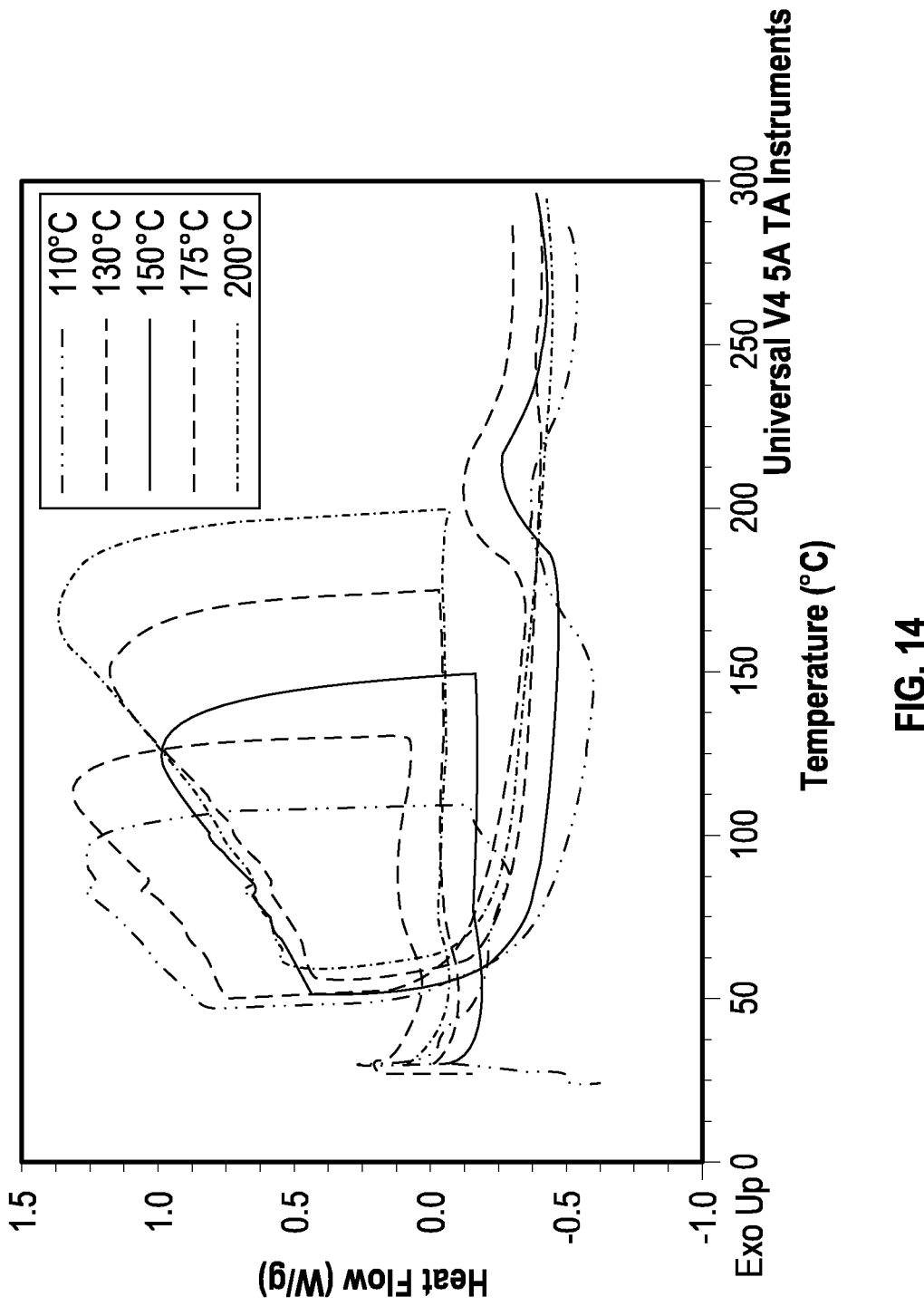
FIG. 14 shows a chart of differential scanning calorimetry (DSC) curves of various Examples.

Examples 1 to 5—FIG. 14 shows a chart of differential scanning calorimetry (DSC) curves of various Examples. The DSC curves of SU-8 Examples were conducted to understand how UV cured SU-8 chemistry behaves with elevated temperatures. This data provided insight on possible post exposure bake (PEB) temperature to use so that the SU-8 layer would be stable during the elevated temperatures experienced during injection molding of the myopia control lens. For instance, the mold for injection molding may be set at temperatures less than the Tg of polycarbonate, but the surface of the insert can reach higher temperatures as the melt first comes into contact with the surface of the insert.

TABLE 1

| | | | Example | | |
|---|---|---|---|---|---|
| | 1 | 2 | 3 | 4 | 5 |
| GBL Content | 0% | 0% | 0% | 0% | 0% |
| UV Exposure | 3 min | 3 min | 3 min | 3 min | 3 min |
| Isothermal | 110° C., 2 hr | 130° C., 2 hr | 150° C., 1 hr | 175° C., 1 hr | 200° C., 1 hr |
| Onset Exotherm after PEB | 150° C. | 175° C. | 175° C. | 210° C. | None |

The epoxy groups are not fully cured with UV exposure alone and additional thermal heating is required for more complete conversion of the epoxy groups. For instance, the examples show a clear trend in the DSC data for a reaction peak with an onset exotherm temperature that shifts higher with increased PEB temperatures. For instance, Example 1 suggests SU-8 layer will be stable up to a temperature of 150° C. with a PEB of 110° C. and still contain some fraction of unreacted epoxy groups. A PEB temperature of 200° C. as suggested by Example 5 would provide the most stable conditions because there is no exotherm remaining indicat- Step 5: The stamp was carefully peeled from the surface of the SU-8 resin film.

Step 6: The wafer/SU-8 was exposed to UV light for 2 minutes (alternatively UV curing can be performed before Step 5).

Step 7: The replicated structures on the wafer were observed by eye first and later analyzed by microscopy if visible by eye.

TABLE 2

| | | | | Example | | | |
|---|---|---|---|---|---|---|---|
| | 6 | 7 | 8 | 9 | 10 | 11 | 12 |
| Stamping Temperature | 25° C. | 110° C. | 110° C. | 110° C. | 130° C. | 130° C. | 130° C. |
| Stamping Pressure | 3.1 psi | 0.5 psi | 1.9 psi | 3.1 psi | 1.9 psi | 3.1 psi | 6.0 psi |
| Micro-structures visibility | Not visible | slightly visible | Visible | Visible | Visible | Visible | Visible |
| Micro-structure base diameter | — | — | 1.17 mm | 1.17 mm | 1.17 mm | 1.17 mm | 1.17 mm |
| Micro-structure height | — | — | 3.30 μm | 3.05 μm | 3.20 μm | 3.14 μm | 2.95 μm | ing all the epoxy groups have been reacted. Furthermore, the onset exotherm is nearly identical for the isothermal of 130° C. for two hours compared to 150° C. for one hour. This indicates that time is also a factor. These results provided a starting point to test how the PEB process could impact micro-lens replication and stability during injection molding.

Examples 6 to 12—Flat silicon wafers were structured with the technique described herein to assess replication quality.

Step 1: A flat silicon wafer was coated with SU-8 obtained from Kayaku Advanced materials using a spin coater set to 1500 RPM.

Step 2: The wafer was soft baked in an oven at 110° C. for 2 hours to evaporate all the solvents to obtain pure SU-8 at a thickness of 20 μm.

Step 3: A flat PDMS stamp cast from a NiP steel micro-structured master was pressed into the SU-8 layer at various temperatures and pressures. The inverted structures on the stamp were characterized by microscopy and found to have the same dimensions as the micro-structures on the master. The structures were spherical-like with a base diameter of 1.17 mm and height of 7.0 μm (see FIG. 15).

Step 4: The ambient temperature was reduced to below 30° C. and the stamp was held at the predetermined pressure until a temperature of at least 30° C. was reached.

Figure 15:
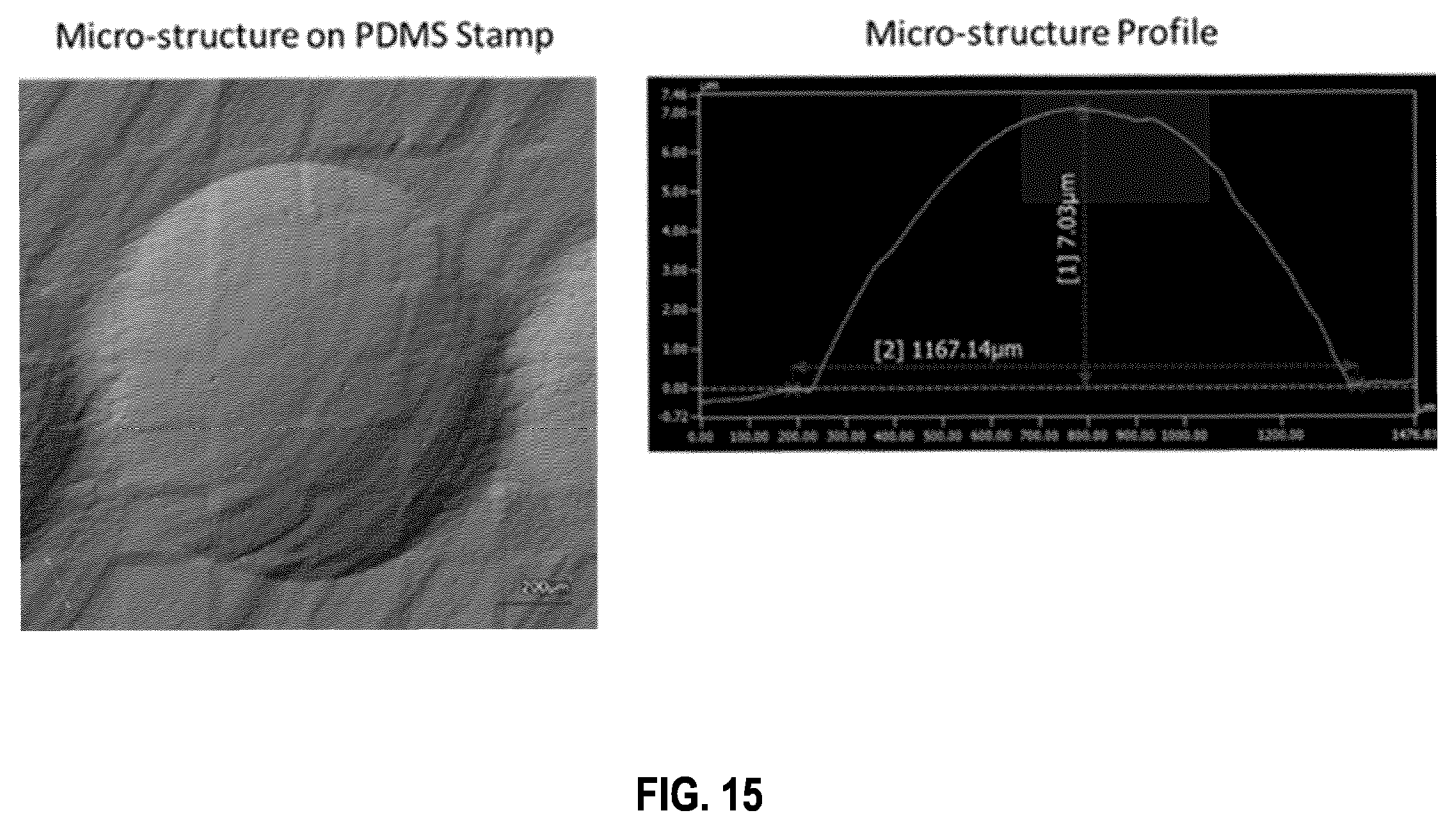

FIG. 15 shows a microscopy image and microstructure profile of an inverted microstructure obtained on the PDMS stamps used for Examples 5 to 11. This was captured using a Keyence VK-X200 series with magnification at 1000×.

Figure 16:
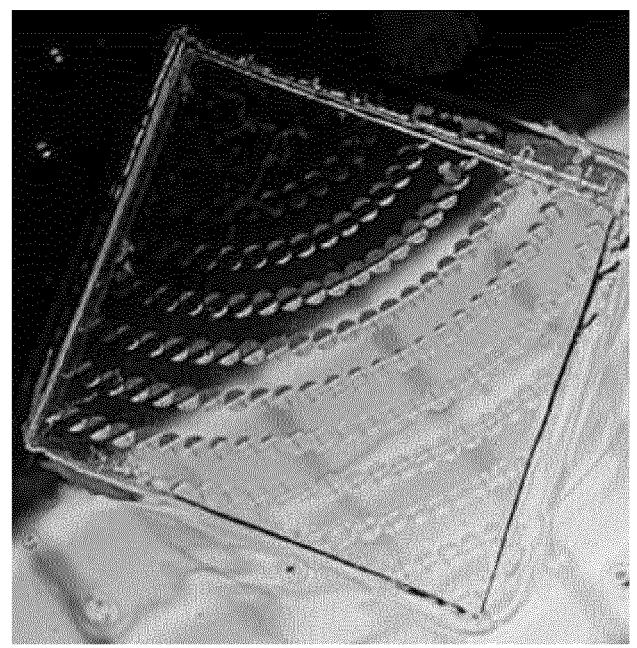
FIG. 16 shows an optical image of the replicated microstructures in the SU-8 layer from Example 9.

FIG. 16 shows an optical image of the replicated micro-structures in the SU-8 layer from Example 9.

Examples 13, 14, and 15—Concave glass inserts were structured with the techniques as described herein to assess replication quality and durability during injection molding.

Figure 17:
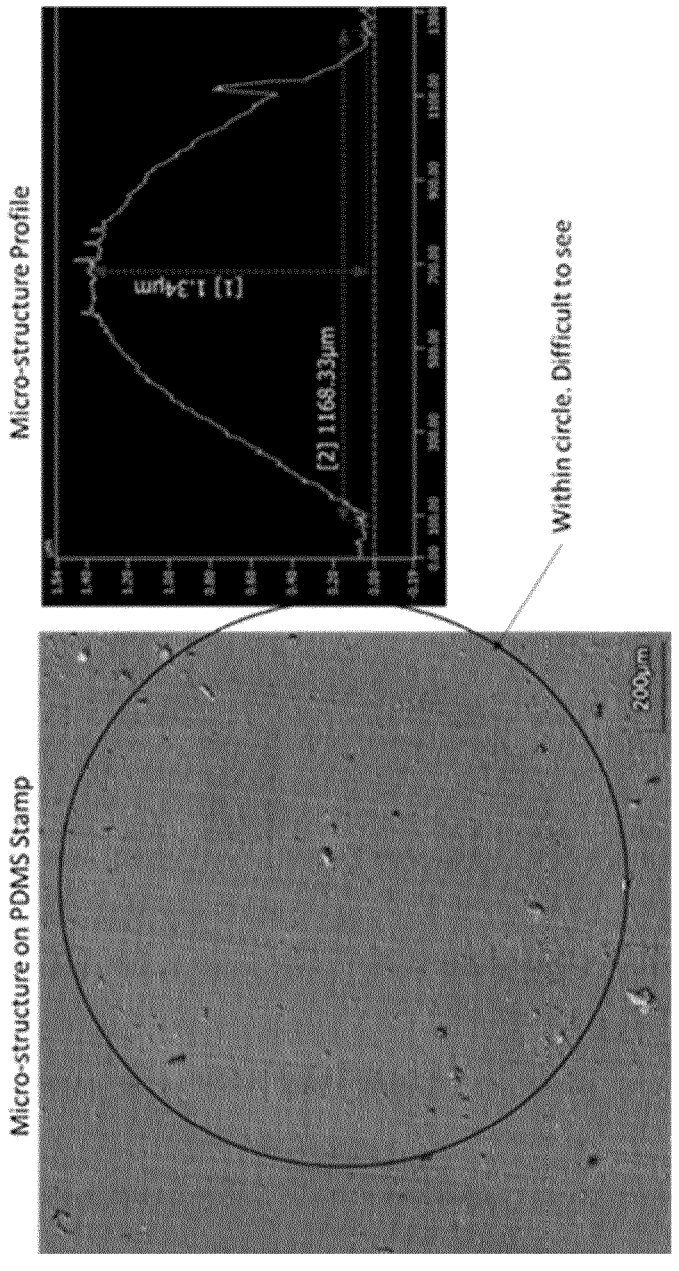
FIG. 17 shows a microscopy image and microstructure profile of an inverted microstructure obtained on the PDMS stamps used for Examples 13 and 14.

The steps were similar to those described for examples 6-12 with the following changes: (1) the NiP steel micro-structured master had a concave base curve of 3.25 diopters and contained smaller microstructures (base diameter=1.17 mm; depth=1.4 μm); (2) the PDMS stamp as shown in FIG. 17 was replicated from the NiP master; (3) The SU-8 layer was applied by paint brush instead of spin because an adequate spin coater for such a heavy insert was not available. Approximate SU-8 thicknesses after soft bake were 5 μm at the thinnest spots to about 20 μm at the thicker areas for Examples 13 and 14. Example 15 had a more consistent SU-8 thickness that was between 20 and 100 μm; (4) the stamping temperature and pressures for Examples 13 and 14 were 115° C. and 3.3 psi, respectively; and for Example 15 was 115° C. and 4.3 psi, respectively; and (5) the structured SU-8/inserts were post baked at 130° C. for 3 hours for Example 13, 150° C. for 3 hours for Example 14, and 175° C. for 3 hours for Example 15.

TABLE 3

Microscopy of Examples

| | | 13 PEB = 130 C., 3 hr | 14 PEB = 150 C., 3 hr | 15 PEB = 175 C., 3 hr |
|---|---|---|---|---|
| SU-8 thickness (thin spots to thicker spots) | | 5 to 20 μm | 5 to 20 μm | >20 um |
| Micro-structures visibility | | Visible | Visible | Visible |
| Microscopy results of Micro-structures on insert after UV exposure | base diameter | 1.17 mm | 1.17 mm | — |
| | Height | 1.4 μm | 1.4 μm | — |
| Microscopy results of Micro-structures on insert after PEB | base diameter | 1.17 mm | 1.17 mm | — |
| | height | 1.4 μm | 1.4 μm | — |
| Microscopy results of Micro-structures on myopia control lens after shot 6 | base diameter | 1.15 mm | — | — |
| | height | 1.33 μm | — | — |
| Microscopy results of Micro-structures on myopia control lens after shot 100 | base diameter | 1.15 mm | — | — |
| | height | 1.31 μm | — | — |
| Injection Molding Durability | | Some delaminations starting by shot 10 for thinner spots. Thickest areas never delaminated. Testing stopped by shot 100 | Some delaminations starting by shot 45 for the thinner spots. Thicker areas never delaminated. Testing stopped by shot 100 | No delaminations observed. Testing stopped after shot 200 |

FIG. 17 shows a microscopy image and microstructure profile of an inverted microstructure obtained on the PDMS stamps used for Examples 13, 14, and 15. This was captured using a Keyence VK-X200 series with magnification at 1000×. Analysis of the results indicate good replication for Examples 13, 14 and 15. This indicates a PDMS stamp with SU-8 layer thickness of 20 μm may be suitable for smaller structures as deep as 1.4 μm. The elastic modulus for PDMS is low and can easily compress. With larger structures more SU-8 material will need to be penetrated and pushed towards the perimeter of the stamp. The flow of SU-8 would become increasingly more restricted towards the insert surface. A more rigid stamp with increased elastic modulus or a thicker layer of SU-8 would be beneficial for spherical structures as deep as 7.0 μm.

Examples 13 and 14 show the structures to be stable even at 150° C. PEB because there is essentially no change in the microstructure dimensions from the master to the PDMS stamp to the SU-8/insert copy even after PEB. The injection molding tests were run with repeated cycles. After each cycle a part is produced which is also referred to here as a shot. For instance, shot 10 would be the $10^{th}$ cycle with the $10^{th}$ part. Example 15 gave the best results with regards to durability during injection molding. Because of increased SU-8 thickness and PEB temperature. Increased thickness being the major contributor as there seems to be a limiting thickness at which delamination can occur as evidence with Example 13 and 14 areas with higher thickness not delaminating. The expansion of the SU-8 relative to glass at the SU-8 to glass interface will increase as the thickness decreases because of heat transfer from the melt. Incorporating silica nanoparticles (GLM2060 low stress provided by Gersteltec Engineering Solutions) into the SU-8 could provide an optimal solution to increase the PEB temperature and minimize thickness if, for instance, delaminations were to occur after, for example, shot 200.

Figure 18A:
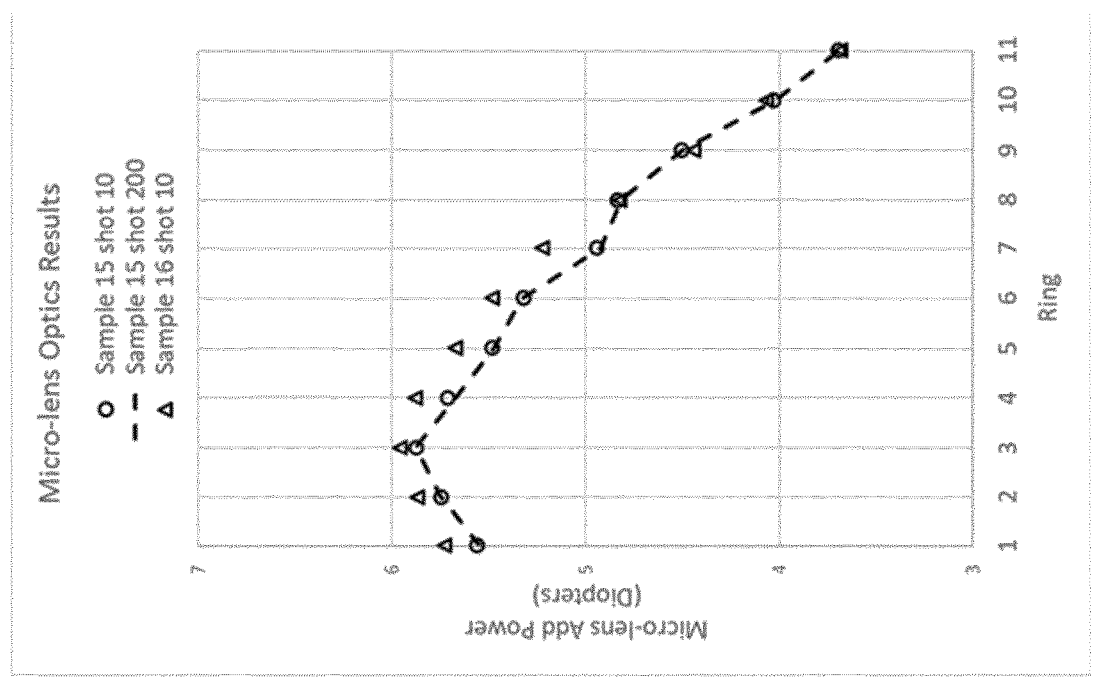
FIG. 18A shows the microstructure optics for Example 15 and 16 lenses measuring the optical power for each microstructure.

FIG. 18A shows the microstructure optics for Example 15 and 16 lenses measuring the optical power for each microstructure. The results are computed for each ring of the microstructure pattern, such as a micro-lens array. There are a total of 11 rings for the design investigated. Each ring containing multiple micro-lenses positioned at a predetermined diameter from the optical center of the lens. Ring 1 can be closest to the optical center and ring 11 can be the furthest from the optical center with a progressive decrease in power as the ring number increases. The results of Example 15 (shot 10 and shot 200) are compared with Example 16 shot 10. Example 16 was produced by injection molding a lens directly from the microstructured NiP steel master. Results show the replicated structures for Example 15 to be very stable during injection molding with essentially no change in optical power from shot 10 to shot 200. The results for Example 15 are very slightly different from Example 16 for rings 1 to 7 but the same for rings 8 to 11. This variation is minimal and very close for a first attempt and can be improved with optimization to the stamping conditions or injection molding parameters (specifically, stamp material, stamping temperature and pressure profile, SU-8 layer thickness consistency, the mismatch between the stamp base curve and the insert base curve; and injection molding mold temperatures, velocities and pressure).

Figure 18B:
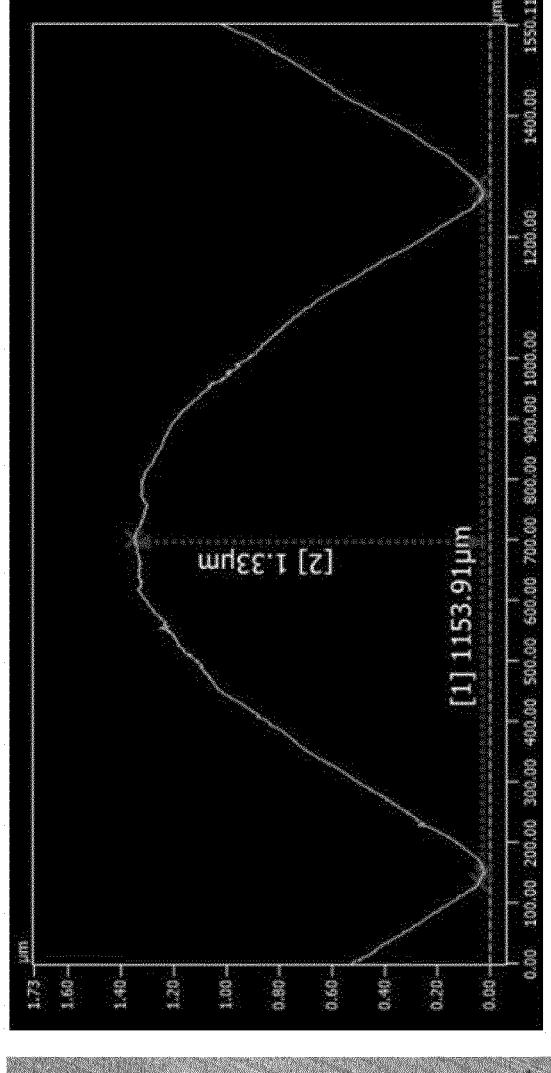
FIG. 18B shows a microscopy image and microstructure profile of a lens produced from Example 12.
Figure 18B:
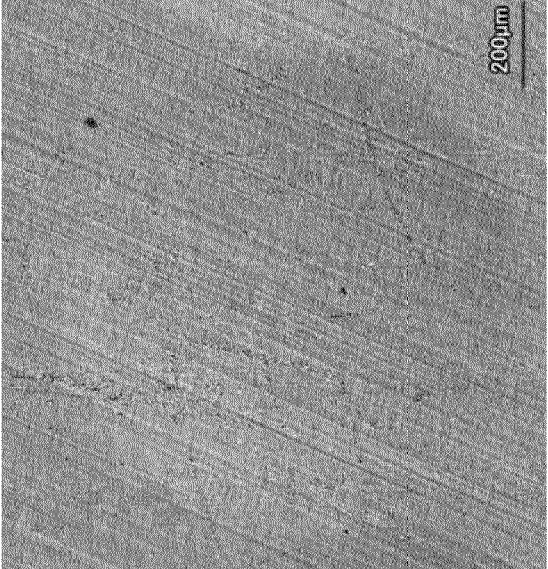

FIG. 18B shows a microscopy image and microstructure profile of a lens produced from Example 12, useful within the scope of the present disclosure. As shown, the plurality of inverted microstructures 190 is replicated well on the surface of the lens to yield the plurality of microstructures 195. Example 12 demonstrates that a quality myopia control lens with stable microstructure geometry can be produced from the method described herein. The lens from, for example, a one hundredth shot can have identical structures as that from, for example, a sixth shot.

Figure 19:
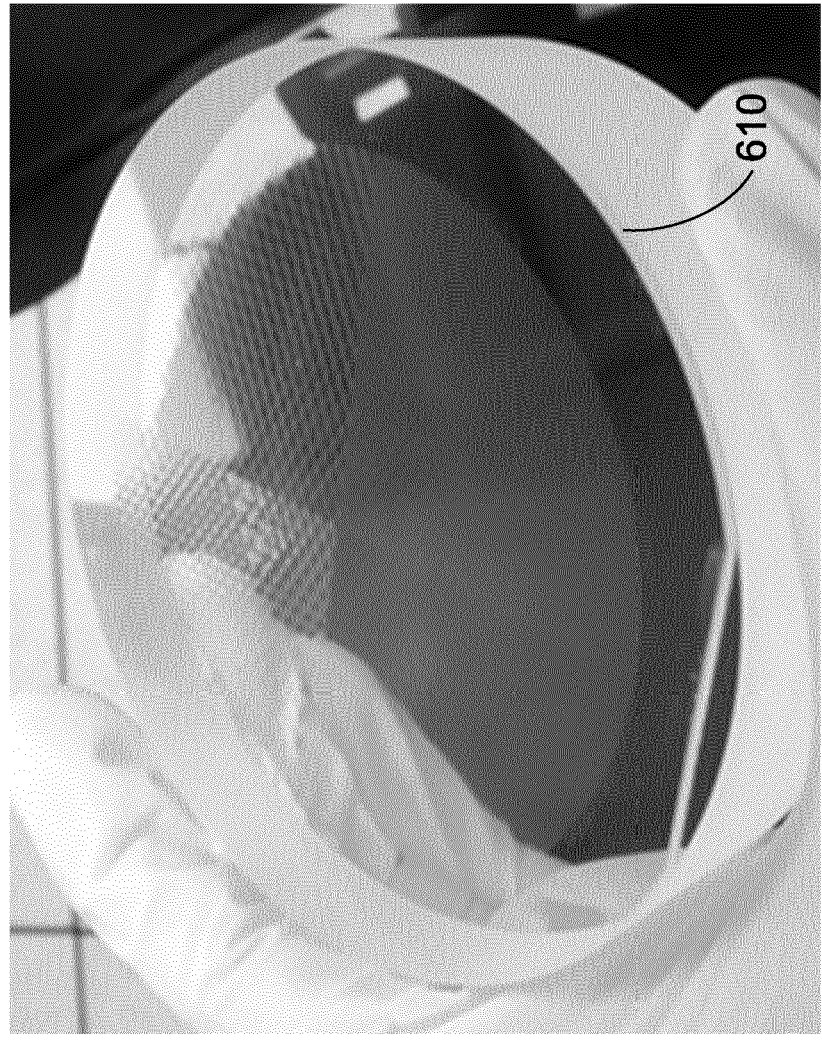
FIG. 19 is an optical image of the master mold including microstructures.

Example 16—FIG. 19 is an optical image of the master mold 610 including microstructures. The microstructured fused silica flat master mold 610 was treated with $O_2$ plasma and silane for at least 6 hours under vacuum, then cleaned with alcohol. Tape was applied around the master mold 610 to form the gasket 605. UV-grade PDMS (KER4690 A+B) was prepared and degassed under vacuum a first time.

Figure 20:
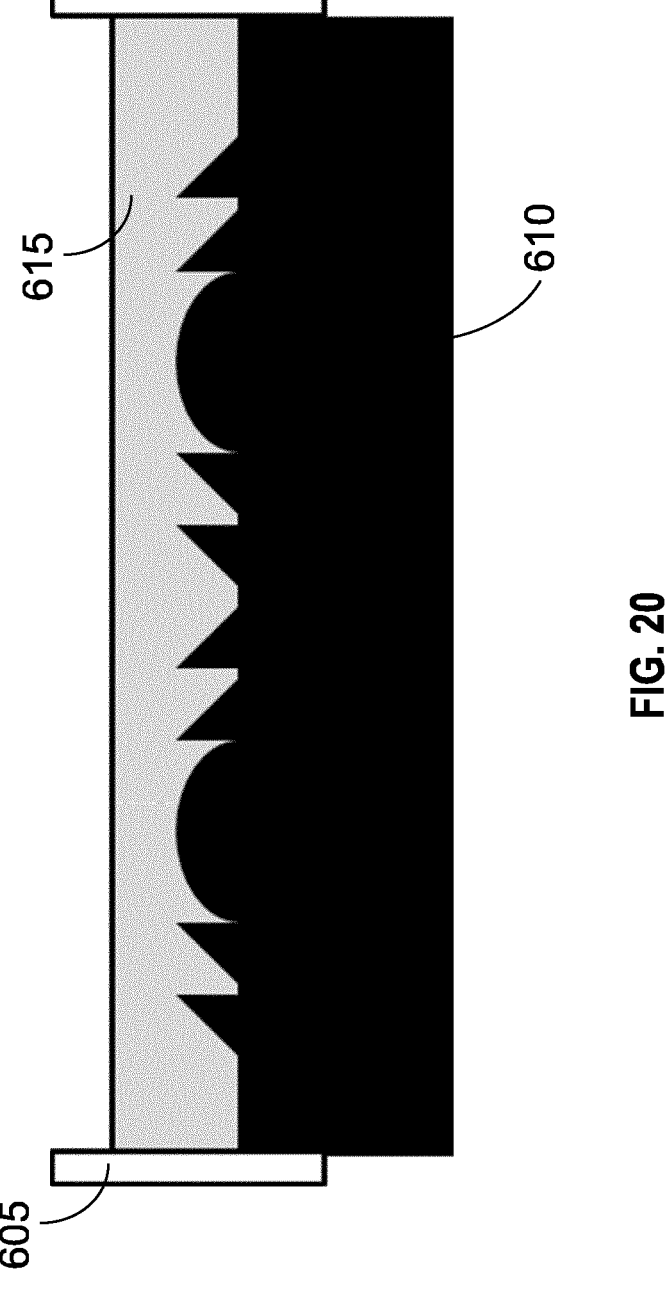
FIG. 20 is a schematic of the master mold including PDMS filled in the gasket.
Figure 21:
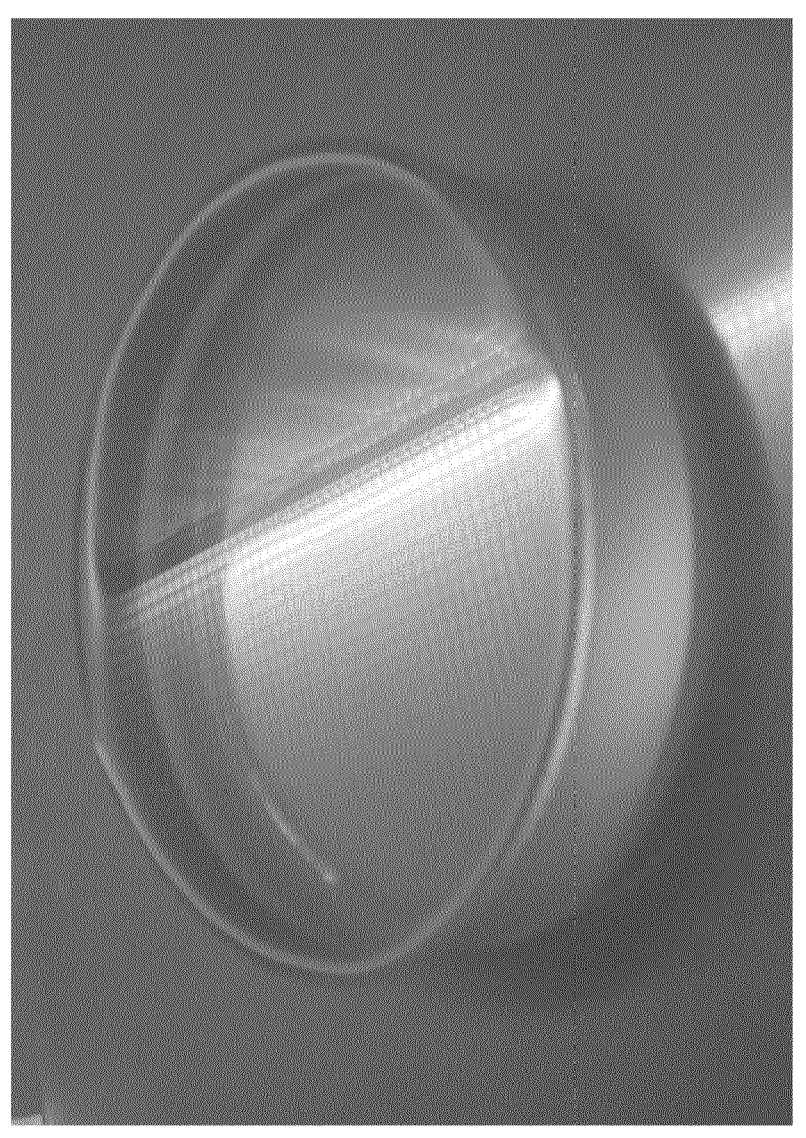
FIG. 21 is an optical image of the master mold including PDMS filled in the gasket.

FIG. 20 is a schematic of the master mold 610 including PDMS filled in the gasket 605. FIG. 21 is an optical image of the master mold 610 including PDMS filled in the gasket 605. Then, the uncured PDMS was poured into the gasket 605 along the surface of the flat master 610. In this Example, 16 g of the PDMS used to form a 2 mm thick membrane. This PDMS was degassed again under vacuum to permit the viscous PDMS to fill the plurality of inverted microstructures 695. Curing of the PDMS was performed under a UV light source (e.g. a mercury lamp) for at least 5 minutes. Once well-cured, the PDMS was pulled off carefully, cured again, and stored away as the stamp 615 from dust and other particulates.

Figure 22B:
FIG. 22B is the first mold insert having a finished surface.
Figure 22A:
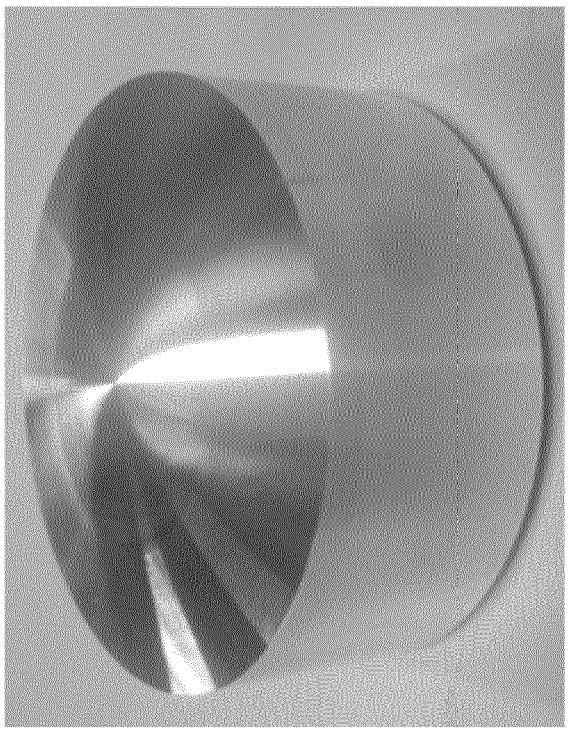
FIG. 22A is an optical image of the first mold insert partially machined.

FIG. 22A is an optical image of the first mold insert 635 partially machined. FIG. 22B is the first mold insert 635 having a finished surface. The first mold insert 635 was turned first roughly or medium milled in a turning machine, followed by a (finer) diamond turning on a higher precision turning machine to form the desired radius of curvature and low roughness for the first mold insert 635. Subsequently, the first mold insert 624 was treated with $O_2$ plasma and coated, via spin-coating, with a primary agent used for glass substrates according to Table 4.

TABLE 4

| Primary agent coating conditions | |
| --- | --- |
| Coating material | OrmoPrime08 |
| Spin speed | 4000 RPM |
| Spin time | 60 s |
| Spin acceleration | 1000 RPM/s |
| Hardbake temperature | 150° C. |
| Hardbake time | 5 min |
| Film thickness | 130 ± 15 nm |
| Storage time | Glass: up to 48 hrs |
| | Silicon: up to 4 weeks |

After baking and cooling, the hybrid resin (ORMO-STAMP from micro resist technology) was the spin-coated according to Table 5. The thickness of the resin film or medium 645 was determined to be between 1 and 10 μm.

TABLE 5

| Resin coating conditions | |
| --- | --- |
| Coating material | OrmoStamp |
| Film thickness | 10 ± 1 μm |
| Spin speed | 3000 RPM |
| Spin time | 30 s |
| Spin acceleration | 1000 RPM/s |
| Prebake (hotplate) temperature | 80° C. |
| Prebake (hotplate) time | 2 min |
| Exposure dose (@ 365 nm) | 1000 mJ/cm² |
| Hardbake (hotplate) temperature | 130° C. |
| Hardbake (hotplate) time | 10-30 min |
| Development (OrmoDev) | 60-180 s |

Figure 23:
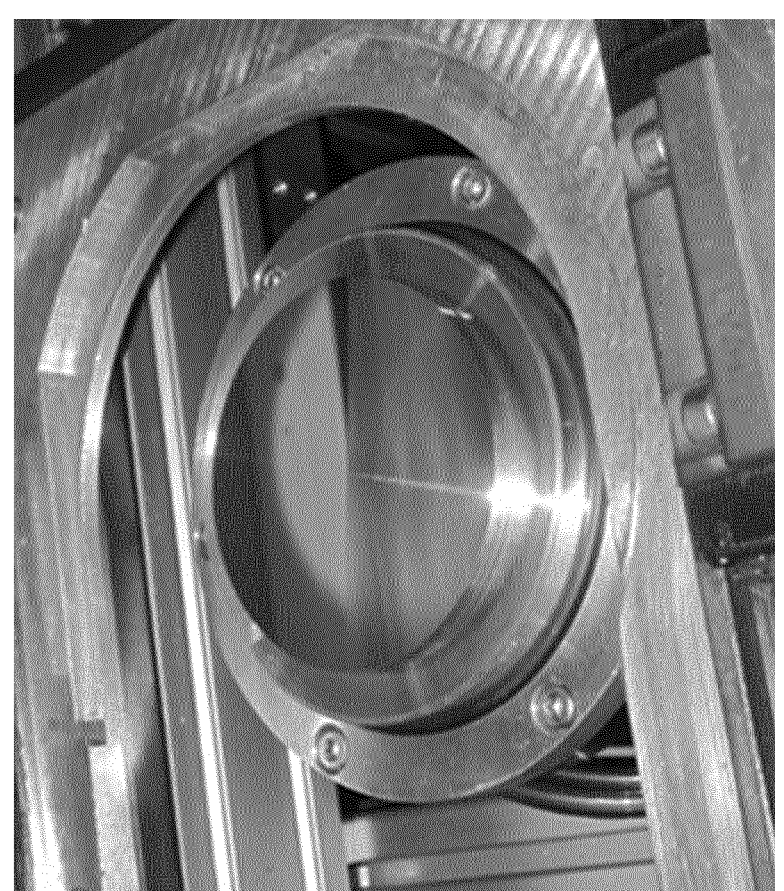
FIG. 23 is an optical image of a holding device for the stamp.

FIG. 23 is an optical image of a holding device for the stamp 625. The PDMS stamp 615 was arranged on and secured to the holding device shown in FIG. 23, such as one used in an experimental lamination device. Notably, vacuum can be used to secure the stamp 615 to the holding device. Notably, the stamp 615 can have a slight curvature such that the center of the stamp 615 can contact the first mold insert 635 first (with the edges last). The stamp 615 can be pressed into the first mold insert 635 including the resin film or medium 645. For example, the stamp 615 can be pressed into the first mold insert 635 over a predetermined length of time, for example, 10 seconds, 1 minute, 5 minutes, 10 minutes, 15 minutes, 20 minutes, or between 5 seconds to 30 minutes and at various speeds from 0.01 mm/sec to 10 mm/sec, for example with the predetermined length of time.

Figure 24:
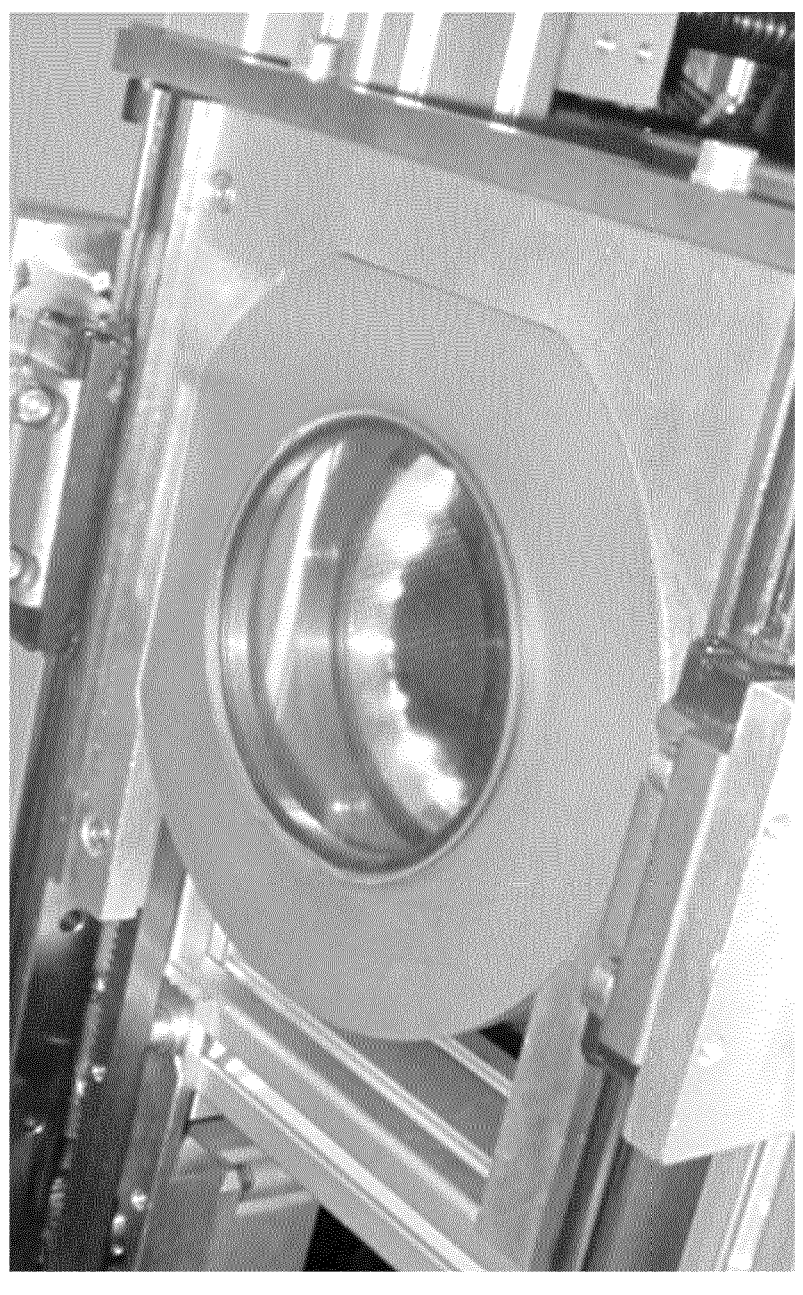
FIG. 24 is an optical image of the stamp pressed into the resin film during curing.

FIG. 24 is an optical image of the stamp 615 pressed into the resin film or medium 645 during curing. Upon the stamp 615 being fully pressed into the first mold insert 635 and the resin film or medium 645, the UV light source can be activated for, for example, 1 minutes, 2 minutes, 5 minutes, more than 30 seconds, or preferably, 90 seconds. Upon completion of the illumination, the stamp 615 was removed from the resin film or medium 645. The first mold insert 635 including the microstructured resin film or medium 645 was then post-cured.

Figure 25:
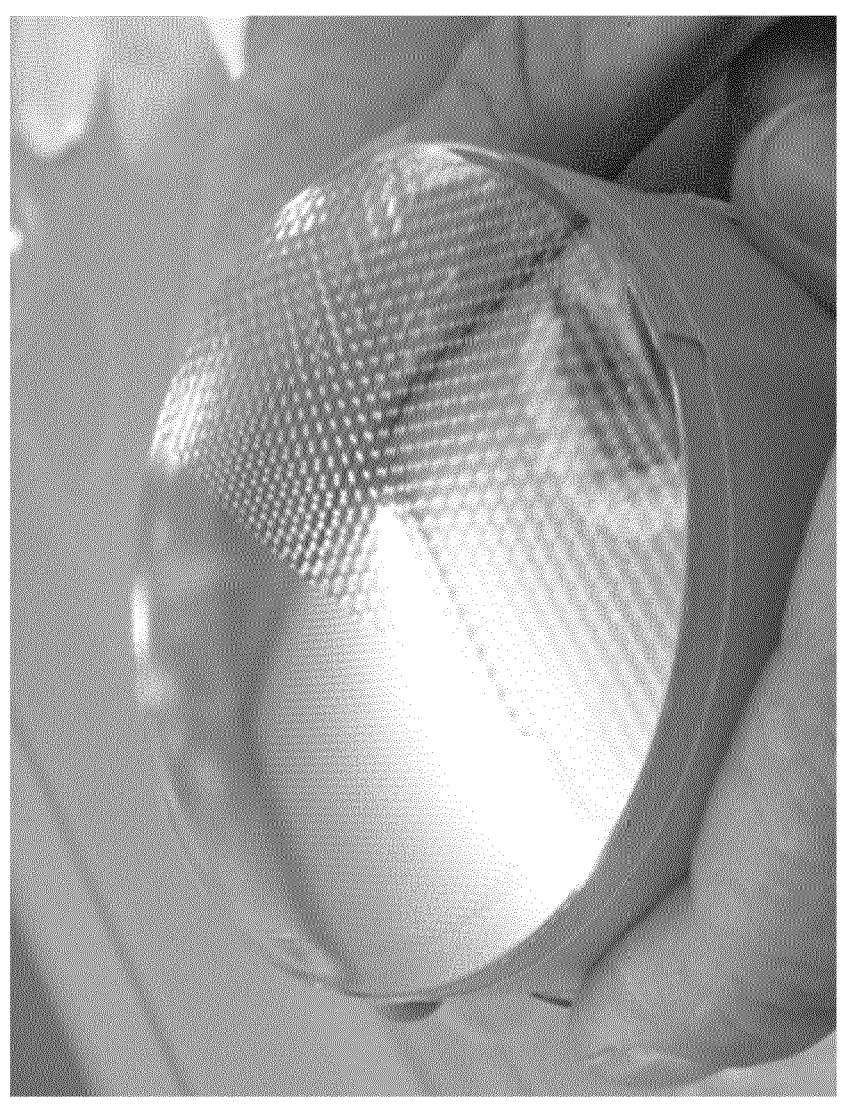
FIG. 25 is an optical image of the first mold insert including the microstructured resin film.
Figure 26:
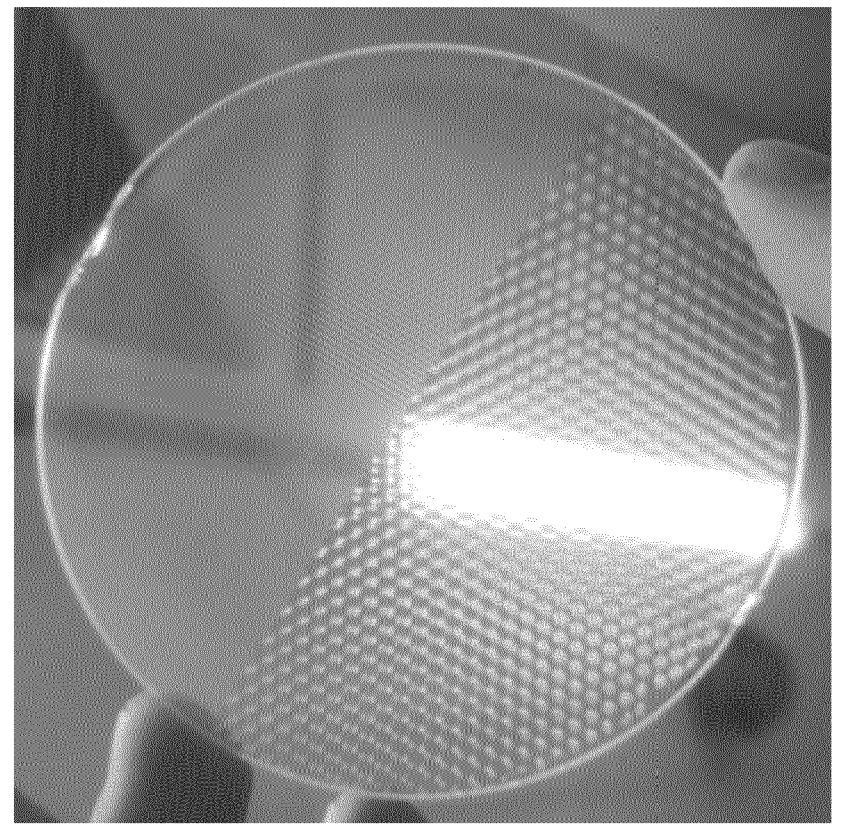
FIG. 26 is an optical image of the first mold insert with a partially delaminated microstructured resin film.

FIG. 25 is an optical image of the first mold insert 635 including the microstructured resin film or medium 645. The first mold insert 635 including the microstructured resin film or medium 645 was then used to injection mold at least 100 lenses. FIG. 26 is an optical image of the first mold insert 635 with a partially delaminated microstructured resin film or medium 645. Even after more than 100 lenses, only a slight delamination of the microstructured resin film or medium 645 was observed.

Notably, additional improvements to accuracy of the resin film or medium 645 for replication via injection molding can be applied after measuring the replicated microstructures in the lenses and determining the needed adjustments. For example, higher aspect ratios, different aspect ratios, different curvatures, etc.

Figure 27A:
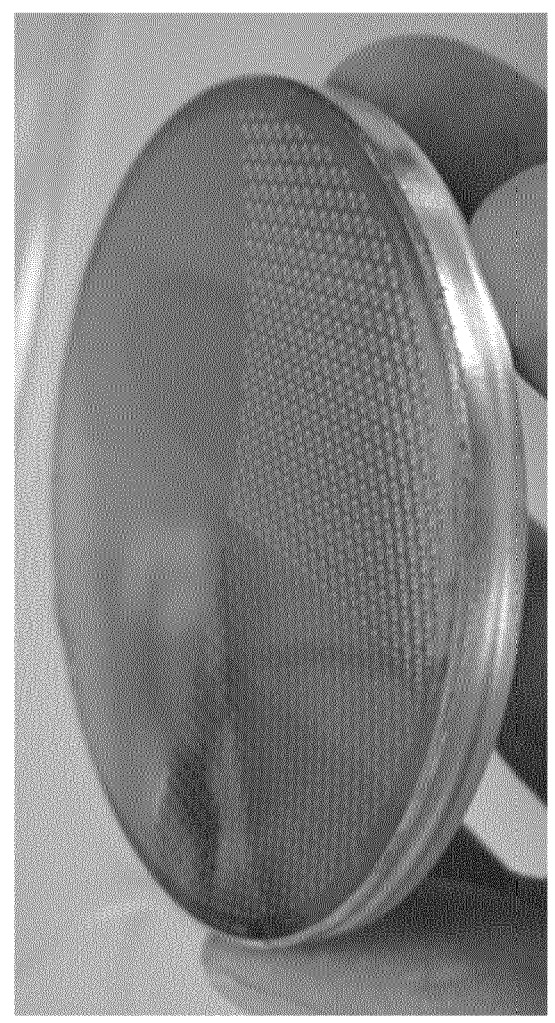
FIG. 27A is an optical image of a copper layer having a thickness of 40 nm that been deposited on a glass mold insert.
Figure 27B:
FIG. 27B is an optical image of an MR8 substrate including an imprinted hard coat.
Figure 27C:
FIG. 27C is an optical image of an imprinted phenol formaldehyde film.

Advantageously, the aforementioned method can be used to imprint other materials. As shown in FIG. 27A, FIG. 27A is an optical image of a copper layer having a thickness of 40 nm that been deposited on a glass mold insert. The glass mold insert can be flat, convex, or concave and used to imprint nickel. As shown in FIG. 27B, FIG. 27B is an optical image of an MR8 substrate including an imprinted hard coat. As shown in FIG. 27C, FIG. 27C is an optical image of an imprinted phenol formaldehyde film.

Figure 28:
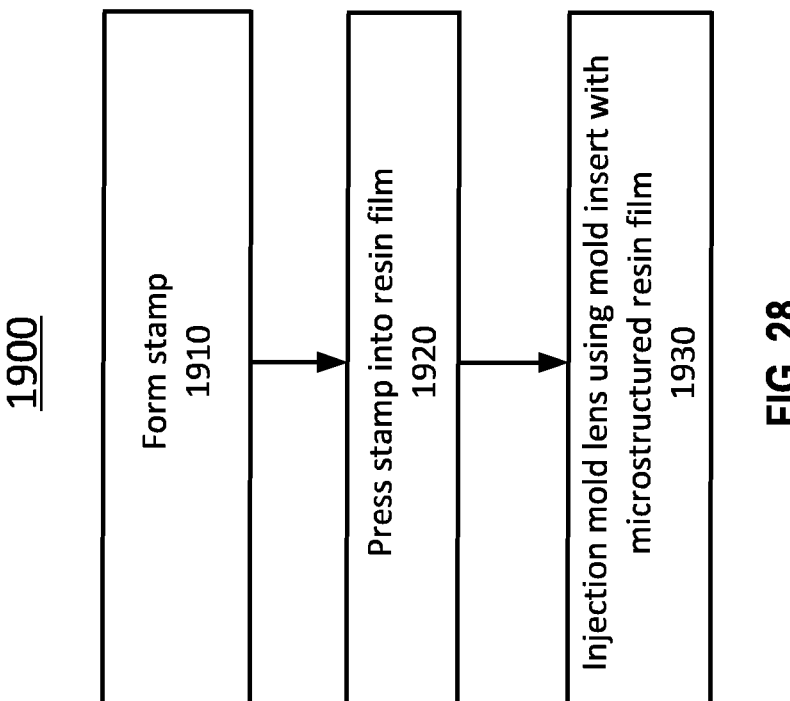
FIG. 28 is an exemplary flow chart for a method of fabricating a microstructured insert, within the scope of the present disclosure.

FIG. 28 is an exemplary flow chart for a method 1900 of fabricating a microstructured insert, useful within the scope of the present disclosure. In step 1910, the stamp is formed. In step 1920, the stamp is pressed into the resin film or medium 645 on the surface of the first mold insert 635. In step 1930, the lens is fabricated via injection molding using the first mold insert 635 with the microstructured resin film or medium 645 formed on the surface of the first mold insert 635.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than specifically described unless expressly indicated otherwise. Various additional operations may be performed and/or described operations may be omitted.

Those skilled in the art will also understand that there can be many variations made to the operations of the techniques explained above while still achieving the same objectives of the disclosure. Such variations are intended to be covered by the scope of this disclosure. As such, the foregoing descriptions of embodiments are not intended to be limiting. Rather, any limitations to embodiments are presented in the following claims.

Embodiments of the present disclosure may also be as set forth in the following parentheticals.

(1) A method of forming a mold insert, including: forming a stamp (615), a surface of the stamp (615) including a plurality of inverted microstructures (695) formed thereon; and pressing the stamp (615) into a film or medium (645) disposed on a surface of a first mold insert (635) to form a microstructured film (645), the microstructured film (645) including a plurality of microstructures (690) formed on a surface of the microstructured film (645) based on the plurality of inverted microstructures (695), the plurality of microstructures (690) being complementary to the plurality of inverted microstructures (695).

(2) The method of (1), wherein the method further comprises covering the surface of the first mold insert (635) with a resin to form the medium (645); and soft-baking the first mold insert (635) covered with the medium (645) of the resin.

(3) The method of either (1) or (2), further comprising curing the medium (645); and post-baking the medium (645) to a thickness of between 0.1 μm and 300 μm.

(4) The method of any one of (1) to (3), further comprising arranging the first mold insert (635) with the microstructured film (645) formed thereon in a molding apparatus including a second mold insert (640), the first mold insert (635) with the microstructured film (645) formed thereon forming a cavity with the second mold insert (640); closing the first mold insert (635) with the microstructured film (645) formed thereon and the second mold insert (640); and injecting a polymer into the cavity.

(5) The method of (1), wherein the stamp is pressed into the medium to attain a difference between a base curve of the stamp (615) from a base curve of the first mold insert (635) within +0.5 diopters.

(6) The method of any one of (1) to (5), wherein covering the surface of the first mold insert (635) further comprises treating the surface of the first mold insert (635) with a plasma before covering the surface of the first mold insert (635) with the resin.

(7) The method of any one of (1) to (6), wherein pressing the stamp (615) into the medium (645) further comprises attaching the stamp (615) to a first fixture (650); attaching the first mold insert (635) with the microstructured film (645) formed thereon to a second fixture (655), the first fixture (650) and the second fixture (655) configured to couple and align the stamp (615) with the first mold insert (635) and the medium (645); and coupling the first fixture (650) having the attached stamp (615) and the second fixture (655) with the attached first mold insert (635).

(8) The method of any one of (1) to (7), further comprising un-coupling the stamp (615) from the microstructured film (645) at a temperature less than 50° C.

(9) The method of any one of (2) to (8), wherein the resin is SU-8 dispersed in a solvent, a total solvent content ranging from 0% to 50%.

(10) The method of any one of (2) to (9), wherein the resin includes oxide nanoparticles.

(11) The method of any one of (1) to (10), wherein forming the stamp (615) further comprises coating, casting, or injection molding a polymer from a surface of a master mold; curing the coating or cast polymer or cooling the injection molded polymer to form the stamp (615); and removing the stamp (615) from the master mold.

(12) The method of (11), wherein a material of the coating or cast polymer includes polydimethyl siloxane (PDMS), fluorinated ethylene propylene (FEP), or polytetrafluoroethylene (PTFE), and the injection molded polymer includes a cyclic olefin copolymer, polystyrene, polymethylmethacrylate, or polymethylpentene.

(13) The method of any one of (1) to (12), wherein forming the stamp (615) further comprises diamond turning the plurality of inverted microstructures (695) onto a metal or polymer and covering the surface of the stamp (615) with a nano-layer.

(14) A molding apparatus, including a mold including a first mold insert (635) and a second mold insert (640), the first mold insert (635) including a microstructured film (645) disposed on a surface of the first mold insert (635), the microstructured film (645) including a plurality of microstructures (690) formed thereon, wherein a material of the first mold insert (635) is glass or metal and a material of the microstructured film (645) is a resin, preferably a resin including epoxy functionality or SU-8.

(15) The apparatus of (14), further comprising processing circuitry configured to couple the first mold insert (635) with the microstructured film (645) disposed thereon and the second mold insert (640) to form a cavity; close the first mold insert (635) with the microstructured film (645) formed thereon and the second mold insert (640); and inject a polymer into the cavity.

(16) The method of (4), wherein the injected polymer melt is polycarbonate.

(17) The method of (4), further comprising opening the first mold insert (635) with the microstructured film (645) formed thereon and the second mold insert (640) to remove a molded lens; determining a thickness of the molded lens; and upon determining a thickness of the molded lens is below a predetermine threshold, inserting the molded lens into the cavity and injecting the polymer melt into the cavity including the molded lens again.

(18) The method of any one of (2) to (13), wherein a material of the first mold insert (635) is glass, metal, steel, aluminum, metal alloy, or a composite.

(19) The method of (5), wherein the molded lens is a multilayer film, a semi-finished lens, a finished lens, or a wafer.

(20) The method of any one of (2) to (13), wherein an area of the stamp (615) is larger than a surface of the first mold insert (635).

(21) The method of any one of (2) to (13), wherein an area of the stamp (615) is smaller than a surface of the first mold insert (635).

(22) The method of either (1) or (2), wherein a thickness of the medium (645) is between 0.1 μm and 500 μm, or 0.5 μm and 400 μm, or 0.75 μm and 350 μm.

(23) The method of any one of (2) to (13), wherein the medium (645) is coated on a secondary assembly and the secondary assembly is assembled on the first mold insert (635).

(24) The method of any one of (2) to (13), wherein the stamp (615) is formed via machining or photolithography.

(25) The method of (3), further comprising engraving the medium (645) before or after post-baking.

(26) The method of (25), wherein engraving the medium (645) further comprises engraving position marks, codes, or design references in the medium (645).

(27) The method of any one of (1) to (13), wherein a material of the stamp (615) has an elastic modulus greater than 0.5 MPa, and pressing the stamp (615) into the medium (645) further comprises pressing the stamp (615) into the medium (645) at a temperature between 10° C. and 250° C., or 15° C. and 200° C., or 15° C. and 180° C. and a pressure less than 20,000 psi, or less than 15,000 psi, or less than 10,000 psi, or between 1 psi and 10,000 psi.

(28) An optical lens manufactured using the method of (4).

(29) The method of (28), wherein a surface curvature of the optical lens is spheric, aspheric, concave, convex, flat, or progressive.

(30) The method of any one of any one of (2) to (13), wherein the surface of the first mold insert (635) is covered with the resin to form the medium (645) by spin coating, spray coating, doctor blading, dip coating, pressing with a stamp or lamination.

(31) The method of any one of (1) to (13), wherein the stamp is formed via machining, diamond turning, or photolithography.

(32) A method of forming a lens, comprising: forming a stamp (615), a surface of the stamp (615) including a plurality of inverted microstructures (695) formed thereon; and pressing the stamp (615) into a film or medium (645) disposed on a surface of the lens to form a microstructured film (645), the microstructured film (645) including a plurality of microstructures (690) formed on a surface of the microstructured film (645) based on the plurality of inverted microstructures (695), the plurality of microstructures (690) being complementary to the plurality of inverted microstructures (695).

The invention claimed is:

1. A method of forming a mold insert, the method comprising:
    forming a stamp, a surface of the stamp including a plurality of inverted microstructures formed thereon;
    pressing the stamp into a medium disposed on a surface of a first mold insert to form a microstructured film, the microstructured film including a plurality of microstructures formed on a surface of the microstructured film based on the plurality of inverted microstructures, the plurality of microstructures being complementary to the plurality of inverted microstructures;
    un-coupling said stamp to obtain the first mold insert with the microstructured film formed thereon;
    covering at least a portion of the surface of the first mold insert with an octafunctional epoxy resin to form the medium; and
    soft-baking the first mold insert covered with the formed medium.

2. The method of claim 1, further comprising curing the medium; and
    post-baking the medium to a thickness of between 1 μm and 300 μm.

3. The method of claim 1, wherein the stamp is pressed into the medium to attain a difference between a base curve of the stamp from a base curve of the first mold insert within ±0.5 diopters.

4. The method of claim 1, wherein covering at least the portion of the surface of the first mold insert further comprises treating the surface of the first mold insert with a plasma before covering the surface of the first mold insert with the resin.

5. The method of claim 1, wherein pressing the stamp into the medium further comprises
    attaching the stamp to a first fixture,
    attaching the first mold insert with the microstructured film formed thereon to a second fixture, the first fixture and the second fixture configured to couple and align the stamp with the first mold insert and the medium, and
    coupling the first fixture having the attached stamp and the second fixture with the attached first mold insert.

6. The method of claim 1, wherein the stamp is uncoupled from the microstructured film at a temperature less than 50° C.

7. The method of claim 1, wherein a material of the stamp has an elastic modulus greater than 0.5 MPa, and pressing the stamp into the medium further comprises pressing the stamp into the medium at a temperature between 15° C. and 180° C. and a pressure less than 10,000 psi.

8. The method of claim 1, wherein the resin includes oxide nanoparticles.

9. The method of claim 1, wherein forming the stamp further comprises
    coating, casting, or injection molding a polymer from a surface of a master mold,
    curing the coating or cast polymer or cooling the injection molded polymer to form the stamp, and
    removing the stamp from the master mold.

10. The method of claim 9, wherein a material of the coating or cast polymer includes polydimethyl siloxane (PDMS), fluorinated ethylene propylene (FEP), or polytetrafluoroethylene (PTFE), and the injection molded polymer includes a cyclic olefin copolymer, polystyrene, polymethylmethacrylate, or polymethylpentene.

11. The method of claim 1, wherein forming the stamp further comprises
    diamond turning the plurality of inverted microstructures onto a metal or polymer and covering the surface of the stamp with a nano-layer.

12. A molding apparatus, comprising:
    a mold including at least a first mold insert, the first mold insert having a microstructured film disposed thereon, the microstructured film including a plurality of microstructures formed thereon,
    wherein a material of the first mold insert is glass or metal, and a material of the microstructured film is an octafunctional epoxy resin.

13. The molding apparatus of claim 12, further comprising processing circuitry configured to:
    couple the first mold insert with the microstructured film disposed thereon and the second mold insert to form a cavity;
    close the first mold insert with the microstructured film formed thereon and the second mold insert; and
    inject a polymer into the cavity.

14. The method of claim 1, wherein the resin further includes a reactive diluent and a photoinitiator.

15. A method of forming a microstructured lens, the method comprising:
    arranging a first mold insert with the microstructured film formed thereon obtained in the method according to claim 1 in a molding apparatus including a second mold insert, the first mold insert with the microstructured film formed thereon forming a cavity with the second mold insert;

closing the first mold insert with the microstructured film formed thereon and the second mold insert; and injecting a polymer into the cavity.

\* \* \* \* \*